US006637276B2

(12) United States Patent
Adderton et al.

(10) Patent No.: US 6,637,276 B2
(45) Date of Patent: Oct. 28, 2003

(54) TIRE SENSOR AND METHOD

(75) Inventors: Dennis M. Adderton, Santa Barbara, CA (US); Stephen C. Minne, Danville, IL (US)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 09/844,193

(22) Filed: Apr. 27, 2001

(65) Prior Publication Data

US 2002/0092364 A1 Jul. 18, 2002

Related U.S. Application Data

(63) Continuation-in-part of application No. 09/724,655, filed on Nov. 28, 2000.

(51) Int. Cl.[7] .................................................. G01L 5/10
(52) U.S. Cl. ................................................... 73/862.41
(58) Field of Search ..................... 73/862.041, 862.043, 73/862.044, 862.045, 862.338, 862.424, 862.627

(56) References Cited

U.S. PATENT DOCUMENTS

| 4,231,410 A | 11/1980 | Vannan, Jr. |
| 4,982,611 A | 1/1991 | Lorenz et al. |
| 5,181,975 A | 1/1993 | Pollack et al. |
| 5,218,861 A | 6/1993 | Brown et al. |
| 5,247,831 A | 9/1993 | Fioravanti |
| 5,341,687 A | 8/1994 | Stan |
| 5,483,827 A | 1/1996 | Kulka et al. |
| 5,500,065 A | 3/1996 | Koch et al. |
| 5,623,096 A | * 4/1997 | Bandyopadhyay ........... 73/147 |
| 5,749,984 A | 5/1998 | Frey et al. |
| 5,960,844 A | 10/1999 | Hamaya |
| 5,964,265 A | 10/1999 | Becherer |
| 5,977,870 A | 11/1999 | Rensel et al. |
| 6,030,478 A | 2/2000 | Koch et al. |
| 6,147,659 A | 11/2000 | Takahashi et al. |
| RE37,065 E | * 2/2001 | Grahn ......................... 73/628 |

* cited by examiner

*Primary Examiner*—Edward Lefkowitz
*Assistant Examiner*—Charlene Dickens
(74) *Attorney, Agent, or Firm*—Martin Farrell; Alan A. Csontos; E. Martin Remick

(57) ABSTRACT

A tire sensor assembly that is embedded in an elastomeric tire at a particular radial depth inwardly from a contact patch of the tire includes a flexible generally pyramid-shaped body and a pair of first strain sensors disposed on first opposed faces of the pyramid-shaped body, the first strain sensors detecting a force in a first direction. In addition, the assembly includes a pair of second strain sensors disposed on second opposed faces of the pyramid-shaped body, the second strain sensors detecting a force in a second direction. Moreover, each face of the first and second opposed faces is non-planar. Preferably, the first and second opposed faces of the pyramid-shaped body are curved and generally symmetrical about an axis extending longitudinally through the apex of the body so as to allow adjustment of the sensitivity of the sensor assembly generally independent of the radial depth. In one example, the first and second opposed faces are concave such that the sensor assembly is more sensitive to a tensile strain and less sensitive to a shear strain.

43 Claims, 14 Drawing Sheets

←— X —→

TIRE SENSOR AND METHOD

CROSS-REFERENCE TO RELATED APPLICATIONS

This application is a continuation-in-part of U.S. Ser. No. 09/724,655 filed on Nov. 28, 2000, and entitled "THREE-AXIS SENSOR ASSEMBLY FOR USE IN AN ELASTOMERIC MATERIAL."

BACKGROUND OF THE INVENTION

1. Field of the Invention

The present invention relates to tire sensors for monitoring vehicle tire performance including tire traction, and more particularly, to a three-axis sensor assembly including a plurality of individual sensor elements disposed in a pyramidal arrangement for use in a vehicle tire.

2. Description of the Related Art

Advances in computer processing power have enabled many improvements to automotive technology in the form of automatic control of vehicle parameters. Engine functions have largely come under computer control with the aid of sensors incorporated into the engine. Advanced and inexpensive sensors and electronics have also enabled traction control and anti-lock braking.

One known system utilizes data pertaining to a tire contact patch in conjunction with driver input and vehicle motion sensors to control the movement of a motor vehicle. The system requires input from a sensor means in the vehicle tire which provides information about changes in the tire footprint. Typically, toroidal bands of either piezoresistive or piezoelectric material incorporated in the rubber of the tire as a transducer of strains present in the tire carcass are void. Notably, the measurement obtained by this device is not localized to a signal tread block, and as a result, suffers from undesirable effects due to centrifugal force, road surface irregularities, and pressure changes.

In another device, reed sensors incorporating strain gauges are employed, each sensor measuring forces directed in a single axis. In this arrangement, three separate devices, disposed at three separate locations, are required to obtain three axes of traction data. A significant problem associated with such a device is that each individual tread block will experience forces from the three axes concurrently. Typically, each tread block acts independently in a stick-slip fashion. As a result, measuring X axis data from one tread block, Y axis data from an adjacent tread block and Z axis data from yet another location, will yield three axes of data that is of little use.

Yet another system includes using a magnetic sensor for determining tire-road adhesion. This device determines the strain within the tire rubber indirectly by measuring a displacement of the sensor from a reference point such as a magnetized region of the steel belt. A more direct measurement of strain would give a better determination of tire-road adhesion than a displacement measurement.

Such a device also has the disadvantage of being difficult to manufacture. It requires that the tire be x-rayed after it is manufactured so as to locate the magnetic sensor. Then the steel belts must be subsequently magnetized in the proximity of the embedded sensor.

Conventional strain gauges or strain sensors are typically used for measuring the expansion and/or contraction of an object under stress. Strain sensors may comprise a resistive transducer, the electric output of which is proportional to the amount it is deformed under strain. In one type of resistive strain gauge illustrated in FIG. 1, the gauge 1 is made of a metal foil or metal wire 2 that is mounted on a substrate 3, wherein the wire changes resistance with expansion or contraction in a particular direction. FIG. 1 illustrates movement of the gauge, which is indicative of movement of the object being monitored, with the arrow "x" indicating movement in the "x" direction. Such a sensor requires either a DC or an AC excitation voltage to generate a strain signal. In addition, it is preferably connected in a differential arrangement such as in a Wheatstone bridge circuit to determine the amount of strain. Other types of strain sensors include parallel plate capacitors, piezoresistive silicon strain gauges, piezoelectric devices such as lead zirconium titanate (PZT), capacitors formed of inter-digitated fingers simulating adjacent parallel-plate capacitors, conductive elastomer resistive strain gauges, etc.

Each of these strain sensors is adapted to measure strain forces exerted on an object in a particular direction. However, multiple axis strain detection is of particular concern for the present invention in determining shear and compressive strain in an elastomeric tire. Monitoring the forces exerted on the tread rubber of a tire in multiple axes can provide an indication as to the performance of the tire (e.g., traction), as well as provide information valuable, for example, in controlling different components of a vehicle. According to one type of tire monitoring sensor, the deflection of tire tread is measured as it passes through a contact patch, the contact patch being defined by that portion of the tire in contact with the road at any particular time. The sensor in this device is a piezoelectric polymer, a photo restrictive fiber optic, a variable plate capacitor, or a variable inductor, each of which is capable of measuring the length of the contact patch during tire operation. In addition, the sensor is connected to a transponder device for communicating single-axis strain data for analysis. Most notably, the data obtained by such a sensor does not provide any useful traction information because it is only capable of measuring the length of the contact patch. As a result, variables which affect the coefficient of friction, such as road condition, are ignored. Overall, this sensor is unable to provide sufficient data for determining tri-axial strain forces of interest.

In general, traction control and anti-lock braking systems fall short of optimal computer control of vehicle handling. What known systems lack in this area is an effective real-time, in-situ measurement of the traction at each individual vehicle tire.

As a result, the field of traction sensing was in need of a sensor assembly that measures strain in three dimensions at a particular point or region so as to monitor tire traction more effectively. Moreover, such a device should be self-contained and be capable of being embedded in an object to be monitored, such as an elastomeric material (e.g., the rubber of a tire), during manufacture of the object without compromising the integrity of its performance.

OBJECTS AND SUMMARY OF THE INVENTION

The present invention is directed to a sensor assembly capable of measuring X-Y shear strain and compressive Z strain while embedded in the tread rubber of a vehicle tire. The preferred embodiment is adapted to being embedded during the manufacture of the tire, and is capable of measuring strain in three axes independent of the particular location within the tire tread. The sensor assembly can be a self-contained device, and as such is well-suited to making three axis measurements at a particular point or region of the tire being monitored. Moreover, the assembly is particularly adapted to generate data to determine tire traction between the footprint of the vehicle tire and the corresponding road surface, whereby one or more of the assemblies can be connected to a transponder to communicate the data to, for example, the vehicle on which the tire is mounted.

According to one aspect of the preferred embodiment, a tire sensor assembly is embedded in an elastomeric tire at a particular radial depth inwardly from a contact patch of the tire. The sensor assembly includes a flexible generally pyramid-shaped body and a pair of first strain sensors disposed on first opposed faces of the pyramid-shaped body, the first strain sensors detecting a force in a first direction. In addition, the assembly includes a pair of second strain sensors disposed on second opposed faces of the pyramid-shaped body, the second strain sensors detecting a force in a second direction. Moreover, each face of the first and second opposed faces is non-planar.

In another aspect of this embodiment, the first strain sensors of the sensor assembly generate corresponding output signals in response to the force in the first direction, the force in the first direction being generally equal to the difference between the output signals of the first strain sensors. Also, the second strain sensors generate corresponding output signals in response to the force in the second direction, wherein the force in the second direction is generally equal to the difference between the output signals of the second strain sensors.

In a further aspect of this embodiment, the first and second opposed faces of the pyramid-shaped body are curved and generally symmetrical about an axis extending longitudinally through the apex of the body so as to allow adjustment of the sensitivity of the sensor assembly generally independent of the radial depth.

In yet another aspect of this embodiment, the sensor assembly is more sensitive to a tensile strain and less sensitive to a shear strain, and the first and second opposed faces are concave.

Another aspect of the preferred embodiment is a method of embedding a sensor in a tire, which includes providing a three-axis sensor assembly having two pairs of strain gauges. A first pair of strain gauges is disposed on first opposed faces of a generally pyramid-shaped body, and a second pair of strain gauges is disposed on second opposed faces of said generally pyramid-shaped body. The method further includes the step of shaping the first and second opposed faces of the pyramid-shaped body so that each face of the first and second opposed faces is non-planar.

In yet another aspect of the preferred embodiment, the first and second opposed faces of the pyramid-shaped body are curved, thus causing the desired sensitivity to be greater in response to a tensile strain and less in response to a shear strain. In addition, the shaping step includes shaping the first and second opposed faces of the pyramid-shaped body so that the faces are concave.

Another aspect of the preferred embodiment is that the desired sensitivity is characterized by greater sensitivity to a shear strain and less sensitivity to a tensile strain. In this aspect, the shaping step includes shaping the first and second opposed faces of the pyramid-shaped body so that the faces are convex.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 2:
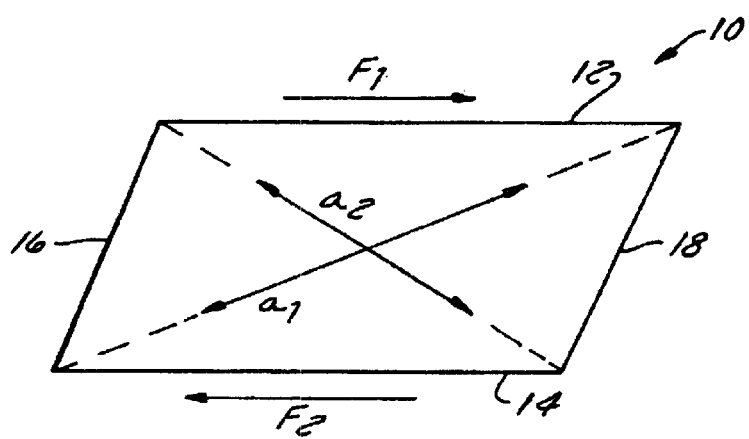
FIG. 2 is a schematic illustration of an elastomeric element under sheer strain.

Referring to FIG. 2, the effects of shear strain on a parallelogram-shaped elastomeric element 10 are shown. Element 10 has two diagonal axes $a_1$ and $a_2$ that intersect. When shear stain is applied, forces $F_1$ and $F_2$ act on opposed top and bottom surfaces 12, 14, respectively, of element 10. In response, elastomeric element 10 flexes and first diagonal axis $a_1$ elongates and second diagonal axis $a_2$ compresses. Note that that strain forces $F_1$ and $F_2$ are equal and opposite.

The force ($F_1 = F_2$) is equal to the strain measured along $a_1$ minus the strain measured along $a_2$. In this first order approximation of the response, $a_1$ is an axis of elongation and $a_2$ is an axis of contraction. Notably, element 10 can be characterized by a range of aspect ratios, thus defining any possible angle between $a_1$ and $a_2$ depending upon desired sensor sensitivity, etc.

Figure 3:
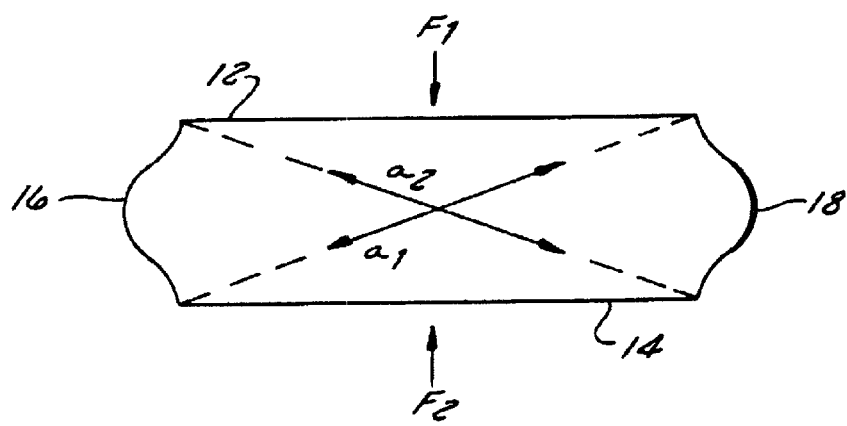
FIG. 3 is a schematic illustration, similar to FIG. 2, showing an elastomeric element under compressive strain.

In FIG. 3, compressive forces acting on element 10 are similarly shown in a first order approximation. Again $F_1$ and $F_2$ act on opposed surfaces 12, 14 of element 10 and are generally equal. However, in this case, $F_1$ and $F_2$ are compressive and each diagonal axis $a_1$ and $a_2$ is contracted as each side surface 16, 18 of element 10 bulges outwardly. Again, the compressive force is equal to a sum of the strain measured along axes $a_1$ and $a_2$. In the preferred embodiment of the present invention, an arrangement of strain sensors is employed to measure these shear and compressive forces in three dimensions.

With further reference to FIGS. 2 and 3, in the case of a tread block of a tire tread, $F_1$ would be applied by the road surface, and $F_2$ would be applied by the tire carcass. This shear strain is analogous to a lateral or linear acceleration of the vehicle acting on the tread rubber at the road surface. Similarly, the compressive strain shown in FIG. 3 is typically always present in the contact region of the tire and will vary as the weight of the car shifts in response to turning, accelerating and braking, for example.

Figure 4:
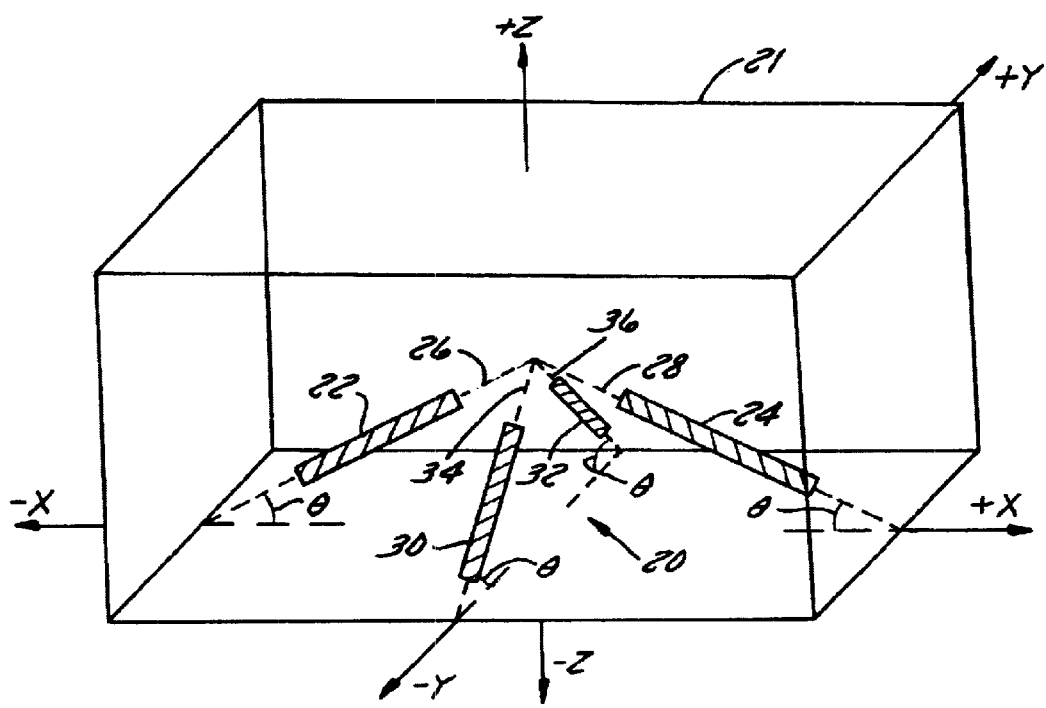
FIG. 4 is a perspective view of a sensor assembly according to a preferred embodiment of the present invention, the assembly being embedded in an elastomeric body.

Turning to FIG. 4, a sensor assembly 20 including an arrangement of strain sensors for measuring strain forces exerted on an elastomeric body 21 is shown. Assembly 20 measures strain forces in a first direction (e.g., the direction of the forces $F_1$ and $F_2$ in FIGS. 2 and 3), as well as strain forces in two directions each orthogonal to the first direction. Note that directions "X", "Y" and "Z" are used herein in conventional fashion, merely as a matter of convenience to illustrate three orthogonal directions.

More particularly, a first pair of strain sensors 22, 24 are disposed along corresponding axes 26, 28 that lie in the X-Z plane, as defined in FIG. 4. Sensors 22, 24 measure tensile strain along their respective axes to collectively determine the amount of shear force in a first direction (e.g., the X direction as shown in FIG. 3). Axes 26, 28 generally correspond to axes $a_1$ and $a_2$ (FIGS. 2 and 3), and thus the force measured by sensors 22, 24 is equal to a differential measurement of the outputs of sensor 22 and sensor 24, as described previously. This force is equal to the amount of shear force in the X direction. Notably, axes 26, 28, along which corresponding sensors 22, 24 are placed, intersect the axis which defines the direction the strain is to be measured (the x axis in FIG. 3) at an angle θ. Angle θ can be selected according to a number of variables including desired sensitivity of the sensor. In a preferred embodiment, θ is forty-five degrees.

Similar to sensors 22, 24, a second pair of sensors 30, 32 for measuring, among other things, forces in a second direction are disposed along corresponding axes 34, 36 which reside in a plane orthogonal to the X-Z plane, the Y-Z plane. Axes 34, 36 intersect the axis of interest (the Y axis) at an angle θ, preferably the same angle at which axes 26, 28 lie relative to the X-axis. Again, the force measured by sensors 30, 32 is equal to the shear strain measured by sensor 30 minus the shear strain measured by sensor 32. This force is the amount of shear strain along the Y-axis.

Using sensor assembly 20 to obtain a measure of both the shear force in the X direction and the shear force in the Y direction, as described above, a compressive force along the Z-axis can be determined. In particular, the compressive force in the Z direction is equal to the sum of the tensile strains measured by sensors 22, 24, 30, and 32. In this way, a separate sensor arrangement for measuring compressive force is not required.

Figure 5:
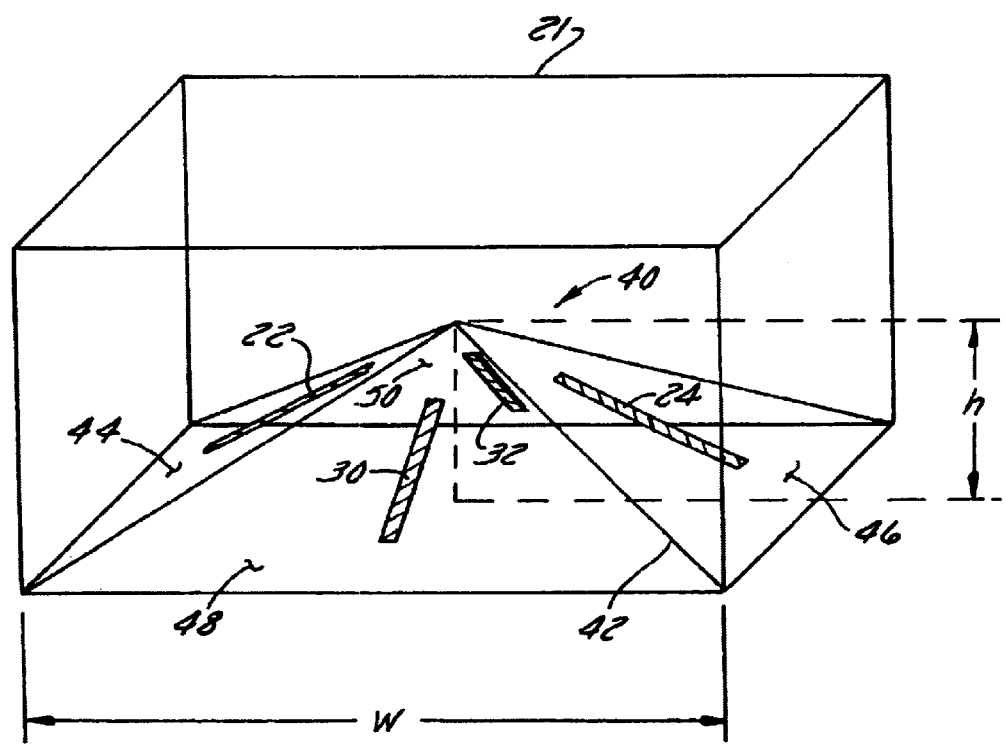
FIG. 5 is perspective view of a sensor assembly according to a preferred embodiment of the present invention, illustrating strain sensors mounted on a pyramid-shaped body embedded in the elastomeric material.

Turning next to FIG. 5, rather than embedding sensors 22, 24, 30, 32 directly in elastomeric body 21 as shown in FIG. 4, a sensor assembly 40 employs a flexible pyramid-shaped body or insert 42 having four faces 44 46, 48, 50 to which sensors 22, 24 30, 32 are coupled, respectively. Pyramid 42 is preferably embedded in elastomeric body 21 (described in further detail below) to measure strain forces exerted thereon.

Pyramid 42 may be made of the same material as the surrounding elastomer of body 21, or may be made of some other appropriate material. Further pyramid 42 may be truncated, having a flat top. The incline of faces 44, 46, 48, 50 (corresponding generally to angle θ depicted in FIG. 4) is chosen to achieve a desired sensitivity of the strain sensors to the applied shear and compressive strains. Moreover, the orientation of pyramid 42 with respect to the applied strain forces may be inverted, thereby inverting the response of the strain sensors 22, 24, 30, 32 to the applied strains.

Figure 1:
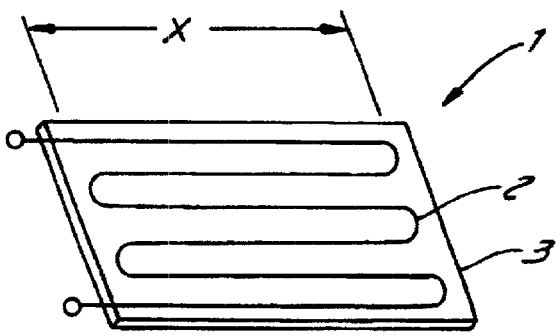
FIG. 1 is a schematic illustration of a prior art resistive strain gauge.
Figure 1E:
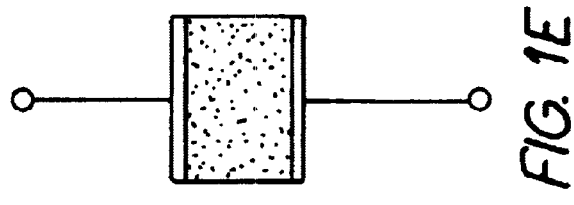
FIGS. 1A–1E are schematic illustrations of exemplary strain gauges for use in a preferred embodiment of the present invention.
Figure 1D:
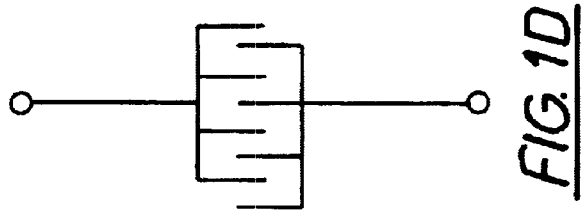
Figure 1C:
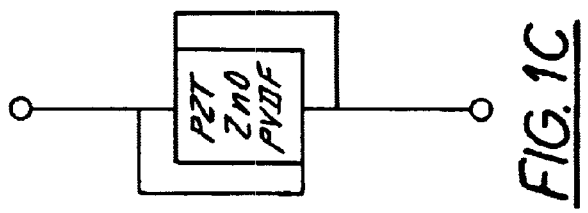

Strain sensors 22, 24, 30, 32 of the sensor assembly (20 in FIG. 3, 40 in FIG. 4) may be any sensor that changes one or more measurable properties as a result of strain along at least one axis. For example, a first preferred type of strain sensor was shown in FIG. 1, illustrating a metal foil or a metal wire resistive strain gauge. This sensor requires either a DC or an AC excitation voltage to generate a strain signal. Moreover, it is preferably connected in a differential arrangement such as in a Wheatstone bridge circuit (for example, see FIGS. 6A and 6B). Another type of useful strain sensor is a parallel plate capacitor shown in FIG. 1A. A parallel plate capacitor may be used to obtain an AC measurement of capacitance. Alternatively, a bias voltage may be applied to the device such that a displacement current is generated when the distance between the plates of the capacitor changes.

Figure 1B:
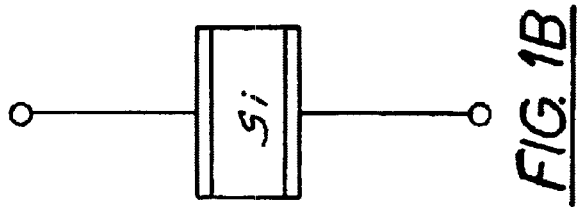
Figure 1A:
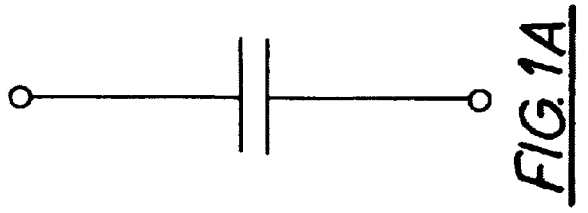

In another alternative, the strain sensors may comprise piezoresistive silicon strain gauges, as shown in FIG. 1B. This strain gauge is typically constructed of micromachined silicon, doped to an appropriate resistance value. Similar to the metal wire resistive strain gauge shown in FIG. 1, the piezoresistive strain gauge is preferably connected in a differential arrangement such as a Wheatstone bridge circuit. Next, the sensors may be piezoelectric devices such as PZT (lead zirconium titanate), ZnO (zinc oxide), or PVDF (polyvinyl diethyl fluoride) devices, like the schematic example shown in FIG. 1C. Piezoelectric devices generate a charge signal in response to the applied strain. A high input impedance buffer is preferably employed with this sensor to preserve low frequency response.

As shown in FIG. 1D, sensors 22, 24, 30, 32 may each be a capacitor formed from two components comprising interdigitated fingers. As applied strain pulls the two components of this sensor away or toward one another, the overlapping area of the fingers will vary, thereby varying the capacitance. Similar to the parallel plate capacitor sensor described previously, the interdigitated capacitor sensor may be used to obtain an AC measurement of capacitance, or a bias voltage may be applied such that a displacement current is generated when the distance between the plates changes. In yet another alternative, a conductive elastomer resistive strain gauge, shown in FIG. 1E, may be employed in the sensor assembly (40 in FIG. 5, for example). An elastomeric medium, such as rubber is doped with conductive particles, such as carbon black. Applied strain will distort the device, changing the spacing between conductive particles, thereby changing the resistance. Similar to the resistor shown in FIG. 1, this sensor requires either a DC or an AC excitation voltage to generate a strain signal. Moreover, the sensor is preferably connected in a differential arrangement such as a Wheatstone bridge circuit. Notably, the above sensors are merely examples of some types of sensors useful in the sensor assemblies of the preferred embodiment, other types of sensing elements could be used as sensors 22, 24, 30, 32, as well as any combination of the above.

Figure 6A:
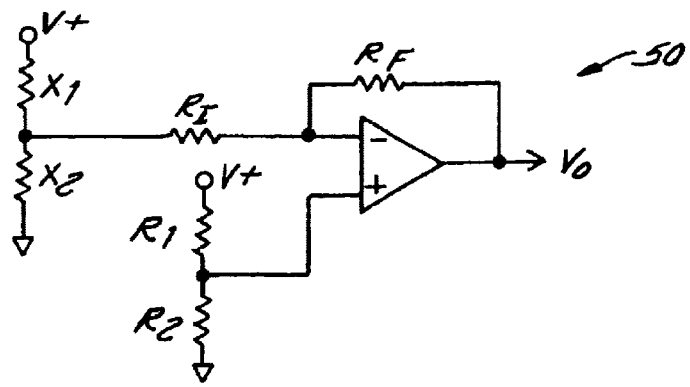
FIGS. 6A and 6B are schematic circuit diagrams for differentially measuring strain detected by resistive strain gauges, according to a preferred embodiment.
Figure 6B:
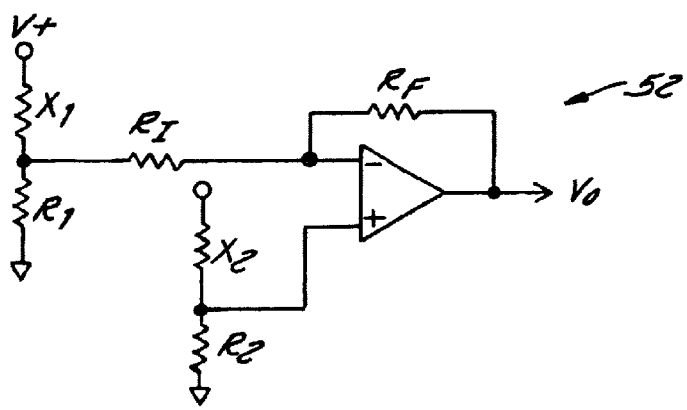

Next, turning to FIGS. 6A and 6B, the output of the resistive-type strain gauges is preferably measured differentially, as described above. FIGS. 6A and 6B show two differential Wheatstone bridge circuit arrangements 50, 52, respectively, capable of measuring strain forces in a single axis. In each case, resistors $x_1$ and $x_2$ (for example, 22 and 24 in FIG. 4 for making x-axis measurements) are strain sensors, preferably disposed as shown in the pyramid arrangement of the preferred embodiment shown in FIG. 5. Resistors $R_1$ and $R_2$ are reference resistors, insensitive to strain. $R_1$ and $R_2$ preferably have a thermal response that is matched to strain sensors $x_1$ and $x_2$. $R_1$ and $R_2$ are also preferably of the same resistance value as the nominal value of $x_1$ and $x_2$. $R_1$, $R_2$, $x_1$, $x_2$ are preferably between 120Ω to 1 kΩ, and more preferably are approximately 350Ω. $R_i$ is the input resistor for the inverting amplifier and $R_f$ is the feedback resistor, and define the gain of the amplifier. Preferably, resistors $R_i$ and $R_f$ are selected so as to yield an amplifier gain of about 100, as is conventional for standard foil-type strain gauges.

More particularly, the output $V_o$ of circuits 50, 52 is indicative of the amount of strain force (for example, shear force) detected by strain sensors $x_1$, $x_2$, wherein output $V_o$ of differential circuit 50 is generally equal to $$V_0 = (V^+)\frac{R_f}{R_i}\frac{R_2}{R_1+R_2} - \frac{x_2}{x_1+x_2} \qquad \text{Eqn. 1}$$

wherein $V^+$ is the excitation voltage (typically, 3 volts), and $a_1$ and $a_2$ are resistance values associated with the strain sensors which, again, have a nominal value preferably equal to 350Ω, and $R_F$ and $R_I$ are the feedback and input resistors, respectively. On the other hand, the output $V_o$ of differential circuit 52 is generally equal to, $$V_0 = (V^+)\frac{R_f}{R_i}\frac{R_2}{x_2+R_2} - \frac{R_1}{x_1+R_1} \qquad \text{Eqn. 2}$$

wherein the variables are defined as in Equation 1.

Notably, circuit 50 in FIG. 6A references $a_1$ to $a_2$. One advantage of circuit 50 is that it can readily cancel unwanted signals since both of these resistors are preferably identical and are similarly disposed, for example on the pyramid (42 in FIG. 5). Further, as such, circuit 50 is easily balanced and is thermally stable. On the other hand, circuit 52 in FIG. 6B has advantages in that it is more readily adapted to incorporation in a circuit that is capable of providing three axes of differential measurement from, for example, the four sensors 22, 24, 30, 32 disposed on pyramid 42. A circuit 60 incorporating circuit 52 for making three-axis measurements is shown in FIG. 7.

Figure 7:
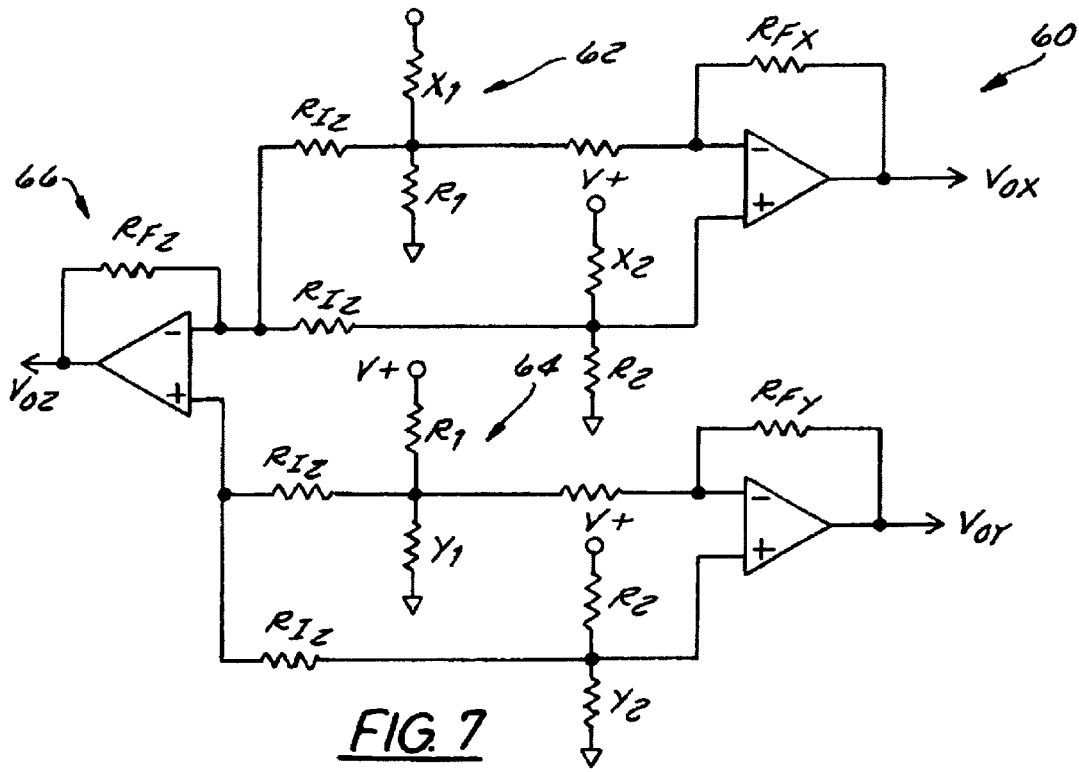
FIG. 7 is a schematic circuit diagram for differentially measuring strain in three axes using, in part, the circuit of FIG. 6B.

With reference to FIG. 7, for resistive-type strain gauges, circuit 60 is employed for making three axis strain measurements. Preferably, two circuits 62, 64 (similar to circuit 52 in FIG. 6B) having corresponding strain sensors $x_1$, $x_2$ and $y_1$, $y_2$, respectively, are electrically coupled to measure shear strain in the x and y axes, respectively. $V_{ox}$ and $V_{oy}$ are computed according to Equation 2 and are indicative of shear strain in the x and y axes, respectively. More particularly, the amount of shear strain in the x and y axes is generally equal to, respectively, $$\frac{V_0}{V^+} = \frac{R_f}{R_i}\frac{R_2}{x_2+R_2} - \frac{R_1}{x_1+R_1} \qquad \text{Eqn. 3}$$

and $$\frac{V_0}{V^+} = \frac{R_f}{R_i}\frac{y_2}{R_2+y_2} - \frac{y_1}{R_1+y_1} \qquad \text{Eqn. 4}$$

wherein the variables are defined as described above, except $y_1$ and $y_2$ are a measure of y axis shear strain.

A third amplifier circuit 66 sums the response of all four sensors $x_1$, $x_2$, $y_1$, $y_2$ (corresponding to sensors 22, 24, 30, 32, for example) to give a signal corresponding to compressive strain in the z axis. Notably, x-axis stage or circuit 62 includes strain sensors $x_1$, $x_2$ on the positive side of the reference resistors $R_1$ and $R_2$, and y-axis stage or circuit 64 includes strain sensors $y_1$, $y_2$ on the negative or ground side of the reference resistors. As a result, the x and y strain signals generated by resistive strain sensors $x_1$, $x_2$, $y_1$, $y_2$ can be summed by using differential z circuit 66 since their polarities are inverted with respect to each other (i.e., the inverted polarity of the two causes z-axis circuit 66, which is a differential circuit, to add the outputs of the strain sensors). The amount of compressive or z-axis strain in this case is generally given by, $$\frac{V_0}{V^+} = -\frac{R_f}{R_i} \cdot \frac{R_1}{x_1+R_1} + \frac{R_2}{x_2+R_2} + \frac{y_1}{R_1+y_1} + \frac{y_2}{R_2+y_2} \qquad \text{Eqn. 5}$$

wherein the variables are defined as described previously.

Figure 8:
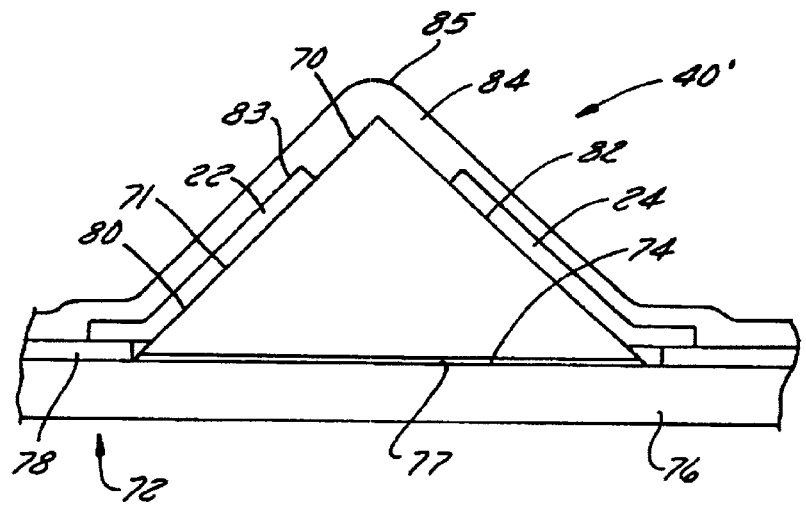
FIG. 8 is a partially broken away cross-sectional view of the components of the sensor assembly of a preferred embodiment of the invention.

In FIG. 8, the components of a sensor assembly 40' are shown arranged according to a preferred embodiment. Sensor assembly 40' includes a flexible pyramid-shaped body or insert 70 that is bonded to a surface 74 of a substrate 76 of a flexible printed circuit 72, preferably with an adhesive 77.

Printed circuit 72 is fabricated with electrical conductors disposed in an epoxy or polyimide substrate 76, while strain sensors 22, 24 (which measure shear strain in a first direction, for example, the x direction) are electrically attached to flexible printed circuit 72 via a connection 78. Moreover, sensors 22, 24 are bonded to surfaces 80, 82, respectively, of flexible pyramid-shaped body 70, preferably by an adhesive such as an epoxy 71. Similar connections are made for a second pair of sensors (not shown) that measure strain forces in a second direction orthogonal to the first direction, for example, the y direction as shown in FIG. 4. Alternatively, substrate 76 could be a silicon integrated circuit (IC) fabricated in conventional fashion. The entire sensor assembly 40' may optionally be potted or coated in a material 84 such as an epoxy or some other material suitable to the user, for example, to scale the strain forces exerted on sensors 22, 24, as discussed in further detail below in conjunction with the preferred application of the present invention.

Figure 9:
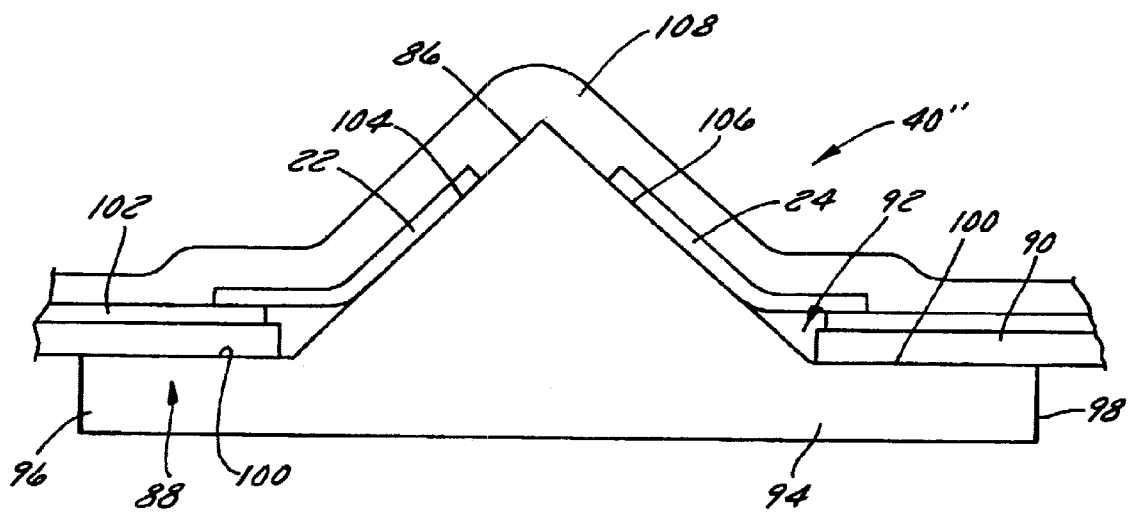
FIG. 9 is a partially broken away cross-sectional view of the components of the sensor assembly according to an alternative embodiment.

In an alternative to sensor assembly 40' of FIG. 8, an arrangement of components of a sensor assembly 40" is shown in FIG. 9. Sensor assembly 40" includes a flexible printed circuit 88 having electrical conductors and circuit components (see FIGS. 6A, 6B and 7) formed in a substrate 90. Substrate 90 has a cutout 92 for a flexible generally pyramid-shaped body 86 to pass through. Body 86 is formed with a flat base 94 having flanges 96, 98 extending outwardly. A top surface 100 of base 94, and particularly flanges 96, 98, is bonded to the bottom surface of the substrate 90 of flexible circuit 88. As in FIG. 8, strain sensors 22, 24 are electrically attached to flexible circuit 88 via a connection 102 and are bonded to surfaces 104, 106 of flexible pyramid-shaped body 86, preferably by epoxy. Again, substrate 90 could be a silicon integrated circuit. Further, the entire assembly 40" may optionally be potted or coated in a material 108 such as an epoxy or some other appropriate material.

Figure 10:
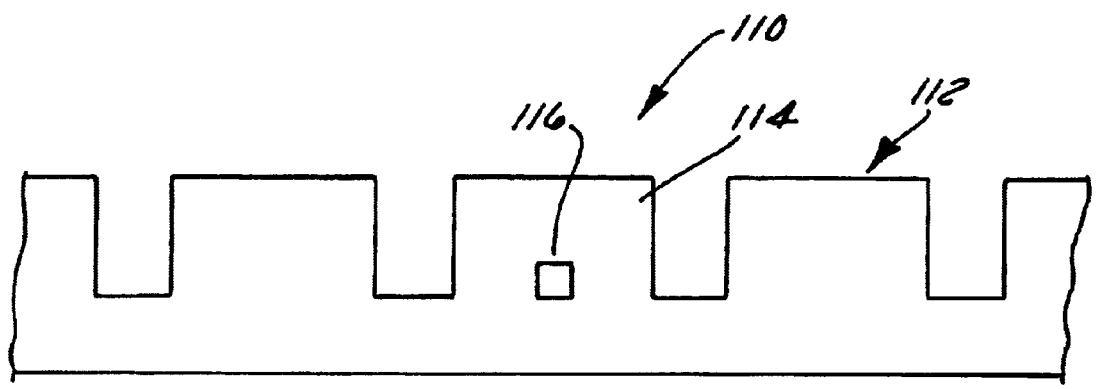
FIG. 10 is a partially broken away cross-sectional view of a tire tread having a sensor assembly embedded therein according to a preferred embodiment.

Referring next to FIG. 10, as suggested previously, a preferred application of the sensor of the present invention is in a tire monitoring environment. FIG. 10 illustrates a cross sectional view of tread rubber portion 112 of a tire 110. A tread block 114 is shown having a device 116 including sensor assembly (for example, 40 in FIG. 5) embedded therein. Notably, device 116 is shown as a square and is oriented to indicate the portion of tread block 114 that is represented in the strain diagrams of FIGS. 2 and 3. Preferably, device 116 is located in a tread block at or near the center portion of the cross-section of the tire so as to ensure the device measures forces acting in the contact region of the tire.

According to a preferred embodiment, sensor assembly 40, having embedded resistive sensors oriented within elastomeric material 21 (such as tread rubber, 112 in FIG. 10) as shown in FIG. 5, provides readily adaptable three-axis strain measurements for the tire monitoring application. During tire operation, strain forces, compressive and shear, acting on the tire are communicated to the sensor assembly 40 such that the forces acting on the tire can be monitored. With pyramid-shaped body 42, accurate orientation of the sensors and maintenance of that orientation throughout the processing of the tire is achieved. Notably, the pyramid-shaped body 42 can be modified to scale the strain exerted on the sensors so that they experience forces primarily in their normal operating range, either by adjusting the elastic modulus of the pyramid material itself, or by adjusting the aspect ratio of the pyramid, the aspect ratio being defined by the ratio of the height "h" and width "w" of body 42, as illustrated in FIG. 5.

In embedding sensor assembly (for example, 40, 40', or 40" in the above Figures) in a tire, or other elastomeric material 21 for that matter, the assembly is preferably introduced to the elastomeric material (in this case, tread rubber) in its uncured state. The tire would then be assembled from its components. A combination of tread rubber and an underlying fiber layer are typically slid into place over a tire carcass (not shown). The assembly is then placed in a curing press. The press applies substantial temperature and pressure to facilitate the vulcanizing reaction. This forms the tread pattern with a mold and vulcanizes the rubber. According to this process, the sensor assembly must withstand the temperature and pressure conditions without allowing the strain sensors to change their orientation. By utilizing pyramid-shaped body 42 and selecting appropriate materials to compose the sensor assembly (as shown in FIGS. 8 and 9, for example) these requirements are achieved.

Notably, the operating range of the sensor must be considered in the manufacturing process. The tread rubber in the position to be measured will experience a maximum shear strain of about 10%, or 100,000 micro strains. Taking a typical foil type resistive strain gauge for example, fatigue and failure will occur if the gauge is repeatedly overstrained. At 1500 micro strain, the gauge will fail after about a million cycles, which would occur in about a thousand miles in a tire. At 1200 micro strain, the gauge will last approximately 100,000 miles. Generally, the amount of strain experienced by a device embedded within another material is related to the ratio of the elastic modulus of the materials. For example, tread rubber has a modulus of elasticity of about 3–7 Mega Pascal's. The foil gauge is preferably encapsulated in polyimide or epoxy (as shown, for example, in FIG. 8 at 83) which has a modulus of elasticity of about 3–7 Giga Pascal's, thus providing a scale factor of about 1000.

Overall, the amount of strain incurred by the sensor assembly including metal resistor strain gauges can be scaled by one or more of the three following components: the dimensions or composition of the pyramid-shaped body (for example, 42 in FIG. 5), the strain gauge encapsulation, or the adhesive or potting material. Alternatively, or in combination with one or more of these components, a topping or coating layer (e.g., 85 in FIG. 8) may be added to further scale the strain exerted on the sensor. The topping, for example, may be brass. In the case where the strain sensor is not a metal resistor, these components, including the topping layer, may still be used to scale the strain at the sensor, however, other types of sensors, such as some of those described above, may not incorporate encapsulation.

In general, if the pyramid-shaped body 42 is made of a material with the same elastic modulus of the surrounding tread rubber, then the combination will behave as a homogeneous medium experiencing a maximum shear strain of, in the above example, 10% shear everywhere. The corresponding force for this strain experienced by the sensor (e.g., 24 in FIG. 5) will scale with the elastic modulus of the tread rubber. If the pyramid-shaped support is comprised of a lower modulus material than the surrounding tread rubber, the assembly will allow a local increase in the amount of sensed shear strain. On the other hand, if the pyramid-shaped support is comprised of a higher modulus material than the surrounding tread rubber, this will locally decrease the amount of sensed shear strain. Overall, because the strain sensing element (for example, sensors 22, 24, 30, 32) is at the boundary between the tread rubber and the material comprising the pyramid-shaped support, the sensing element will benefit from any local adjustment to the strain made by adjusting the elastic modulus of the pyramid-shaped body 42.

With more particular reference to the characteristics of the pyramid-shaped body (for example, 42 in FIG. 5), the body may be constructed of natural or synthetic rubber. Since the pyramid must maintain the orientation of the sensors during tire curing (i.e., vulcanization), the body 42 is preferably made of pre-cured rubber, or a synthetic rubber which is stable above curing temperatures. Preferably, the hardness of the body is equal to or greater than that of the tread rubber where the device will be embedded. Tread rubber is usually between 50 and 70 on a Shore A hardness scale. For greater stiffness, or hardness, material such as polyimide, urethane or epoxy may be used for the body. Metals or crystalline materials may also be used for the pyramid-shaped body. However, if the body 42 is too hard with respect to the rubber of the tire, the strain forces may become undetectable. It is also possible, typically at the interface of the body and the tread rubber, that the strain vectors rotate out of the pyramid surfaces due to the coupling imperfections at the boundary. In this case, one remedy is to modify the aspect ratio of the body to optimize the sensitivity of the x and y axes with respect to the z axis measurement. Also, the z-axis measurement from the pyramid sensor may be supplemented or replaced by a bulk z-axis signal for the whole contact patch as collected from a suspension sensor or some other source.

Moreover, the properties of the strain sensing element itself and the epoxy, which are located at the boundary between the pyramid support and the tread rubber, act together to resist the strain of the surrounding materials. Due to the orientation of the sensing elements on the pyramid faces, the shear strain applied to the entire sensor assembly manifests as tensile strain for the strain sensing element. The elastic modulus of the adhesive (epoxy 71 in FIG. 8) may be chosen to be higher than that of the surrounding materials such that it provides resistance to the tensile strain, thereby reducing the strain experienced by the strain sensing element.

More particularly, encapsulation, adhesive, and potting may comprise three different materials, or may be reduced to one or two unique materials, thereby combining their form and functions. Initially, metal foil type strain gauges 22, 24, 30, 32 are often provided with epoxy or polyimide encapsulation (83 in FIG. 8). Encapsulation serves two main functions. First, the encapsulation material should be readily adaptable to facilitating a secure connection with the pyramid-shaped body. Second, the encapsulation may serve as a means to scale the strain at the sensor, based on selected differences in the modulus of elasticity.

Next, the sensors must be adhered to the pyramid-shaped body by some means (e.g., 71 in FIG. 8). Adhesion between the components of the device is vital for its survival. The components may be of different materials with different elastic properties. The adhesive must bond these components and withstand billions of strain cycles without failure. Some materials which meet these requirements include epoxy, polyimide and polyurethane. Epoxy is the preferred adhesive because of its ability to adhere well and remain temperature resistant. The adhesive is preferably applied as a thin layer between components, such as between the body and the sensors.

In addition to the thin layer of adhesive between components, an excess of the adhesive may be applied, such that the assembly is potted, partially or entirely, with the adhesive to insure a uniform and controllable outer surface (84 in FIG. 8, for example). Alternatively, two different materials may be used for adhesion between components and for potting, respectively. Notably, however, the outermost surface (e.g., the potting) of the three-axis device should be of a material that is compatible with the embedding and curing process.

Notably, the survival of a device cured into a tire tread requires that the device adheres to the surrounding rubber and therefore the device must be appropriately prepared. Known methods include using specially formulated chemicals, as is known in the art, for improving adherence of the various materials employed, including epoxy and polyimide, to the surrounding rubber during the curing process.

Next, because the device is preferably embedded in a vehicle tire, the available power is very limited. High resistance strain gauges can be employed to reduce power consumption. They may, however, have a shorter fatigue life due to thinner conductors. Lower voltage excitation can also be used to trade off signal-to-noise for lower power. AC excitation of the resistor gauges can also reduce power consumption, but add to circuit complexity. Alternatively, a piezoelectric sensor can advantageously be used since it draws no current.

The flex circuit (for example, 72 in FIG. 8) which acts as the substrate for the electrical wiring of the device is preferably constructed of polyimide or epoxy as in the case of most readily available flex circuit products. Bonding between the substrate and the pyramid should be appropriate for the materials being bonded to maintain the integrity of the bond. The substrate may also incorporate a set of four strain sensing devices to complete the bridge circuit with the four sensors on the pyramid-shaped body. Again, in an alternative, the substrate is a silicon integrated circuit, incorporating the electronics to difference and amplify the strain signals, as described previously.

PZT (lead zirconium titanate) sensors, schematic shown in FIG. 1C, can be used in place of resistive strain gauges in order to save power. PZT is brittle yet highly sensitive. To bring the strain into the range of these devices, the pyramid-shaped body is made of a relatively hard epoxy, and the sensor assembly is preferably encapsulated in the same epoxy. In one arrangement, the device could be assembled from four individual piezo crystals. Otherwise, PZT could be deposited on the body itself, or on a substrate to be formed into a pyramid-shaped body.

Figure 11:
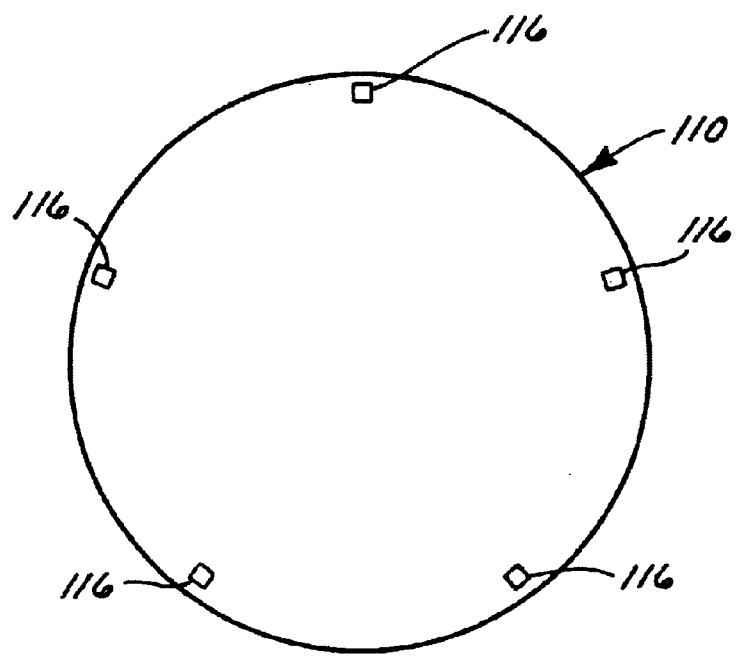
FIG. 11 is a schematic side elevational view of a tire including a plurality of sensor assemblies of the preferred embodiment disposed around the perimeter of the tire.

In FIG. 11, multiple devices 116 (FIG. 10) including sensor assemblies (for example 40 in FIG. 5) are distributed around the circumference of tire 110. Any number of sensor assemblies may be employed. Preferably, the sensors are separated sufficiently along the circumference such that only one sensor is allowed to pass through the tire's contact region at any particular time. Notably, an increase in the number of sensor assemblies will decrease the sensitivity of any one sensor assemblies if they are summed or averaged together as in the case with any of the sensor busses described hereinafter. The preferred number of sensors is between 3 and 10.

Figure 12:
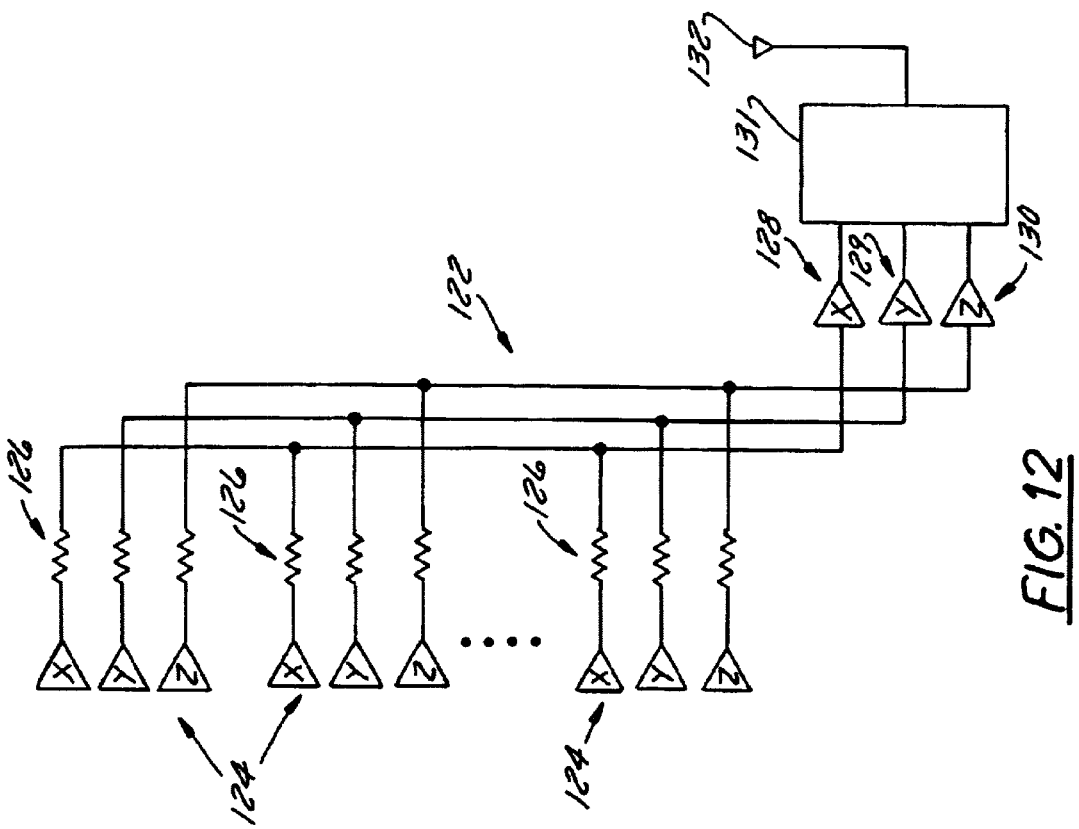
FIG. 12 is a schematic circuit diagram illustrating the outputs of a plurality of sensor assemblies coupled to a sensor bus.

In many applications, including the tire monitoring application described above, it is desirable to have multiple sensor assemblies positioned at different locations in the environment. Referring to FIG. 12, in order to avoid independent processing of a multitude of three axis sensor outputs, a sensing system 120 including a sensor bus 122 is employed to couple the outputs of a plurality of sensor assemblies so that the outputs can be summed or averaged via sensor bus 122 which connects each of sensor assemblies together. System 120 is appropriate for each of the different types of strain sensors discussed previously, provided the outputs of sensor assemblies are buffered by an amplifier 124 (or transistor) in conventional fashion. Preferably, each buffer circuit 124 includes a resistor 126 that couples the corresponding strain sensor output to sensor bus 122, and in particular, one conductor of bus 122 for each strain axis being monitored.

Next, bus 122 terminates at an independent summing or averaging amplifier 128 associated with each strain axis. As a result, the sensor outputs of the plurality of three axis sensor assemblies are reduced to three signals. The data output from amplifiers 128, 129, 130 is communicated to a data transmitter 131 for transmission to, for example, a remote location for further processing.

Notably, as mentioned above, in the case of multiple sensor assemblies in the tire monitoring application, the assemblies are preferably disposed at mutually spaced intervals around the circumference of the tire. Moreover, the intervals are preferably large enough such that no more than one sensor assembly passes through the contact region of the tire at any particular time. As a result, sensing system 120 can readily obtain three axis measurements at a particular location of the tire. Furthermore, by reducing the number of signals with this arrangement, system 120 provides significant advantages, especially when the signals communicated to data transmitter 131 is a wireless data link including antenna 132. Notably, the limited bandwidth of data transmitter 131 and the power requirements for increasing the bandwidth or adding channels, render it prohibitive to transmit output signals from each axis of each sensor assembly independently. However, if the application demands that sensors are spaced more frequently, such that more that one is collecting valid data at a given time, it may be advantageous to equip a tire with more than one sensor bus arranged such that the sensors from the different busses are interlaced. Therefore, even with closely spaced sensors, it is possible to realize the advantages of the sensor bus while maintaining no more than one sensor of a given bus in the contact patch at a given time.

Figure 13:
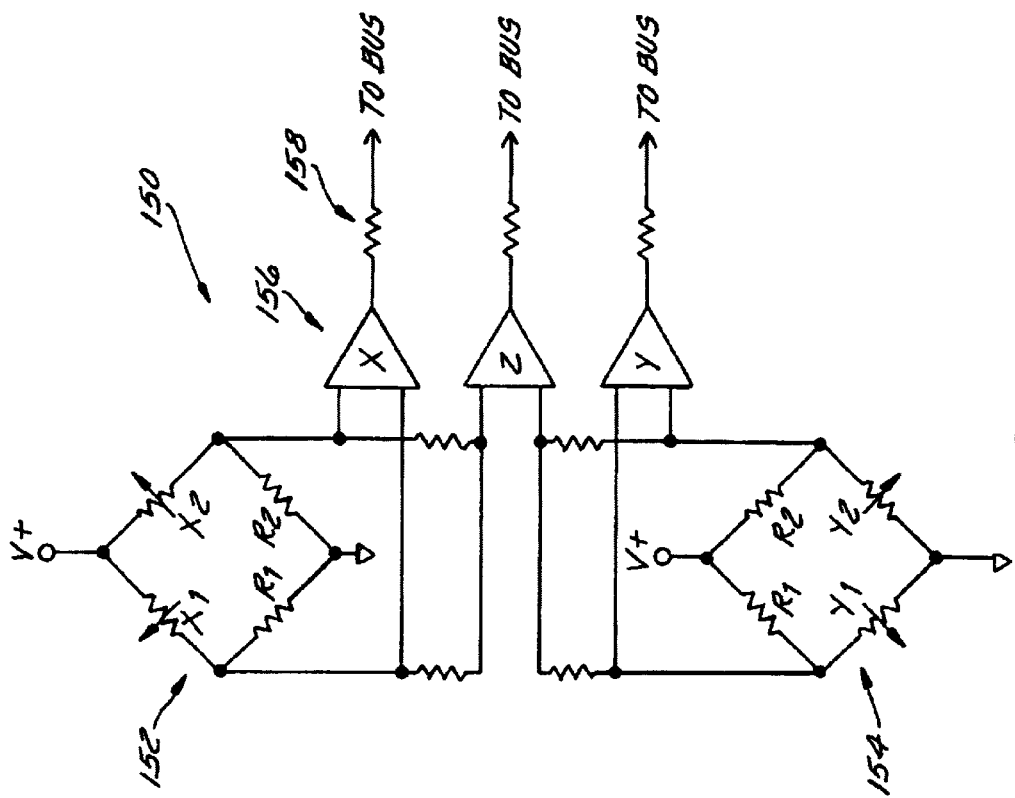
FIG. 13 is a schematic circuit diagram, similar to FIG. 7, showing a more generalized configuration of circuit components.

Referring next to FIG. 13, a more generalized schematic 150 of the circuit shown in FIG. 7 is illustrated, including an x-axis measuring stage 152, and a y-axis measuring stage 154. Unlike the circuit in FIG. 7, the amplifiers 156 are shown as general circuit blocks without indication of the gain elements, i.e. resistors. Resistors 158 are shown at the outputs of the amplifiers associated with the three axes being measured for the purpose of summing the corresponding outputs of the sensor assemblies via sensor bus 122 of FIG. 12. Circuit 150 is preferably used for the resistive strain sensors (described previously) when sensor bus 122 of FIG. 12 is employed. Sensor bus 122 of FIG. 12, employing circuit 150, requires three signal wires associated with each axis of measured strain force, plus the power and ground wires, for a total of five wires to be routed to the location of each sensor assembly, for example, 40 in FIG. 5.

Figure 14:
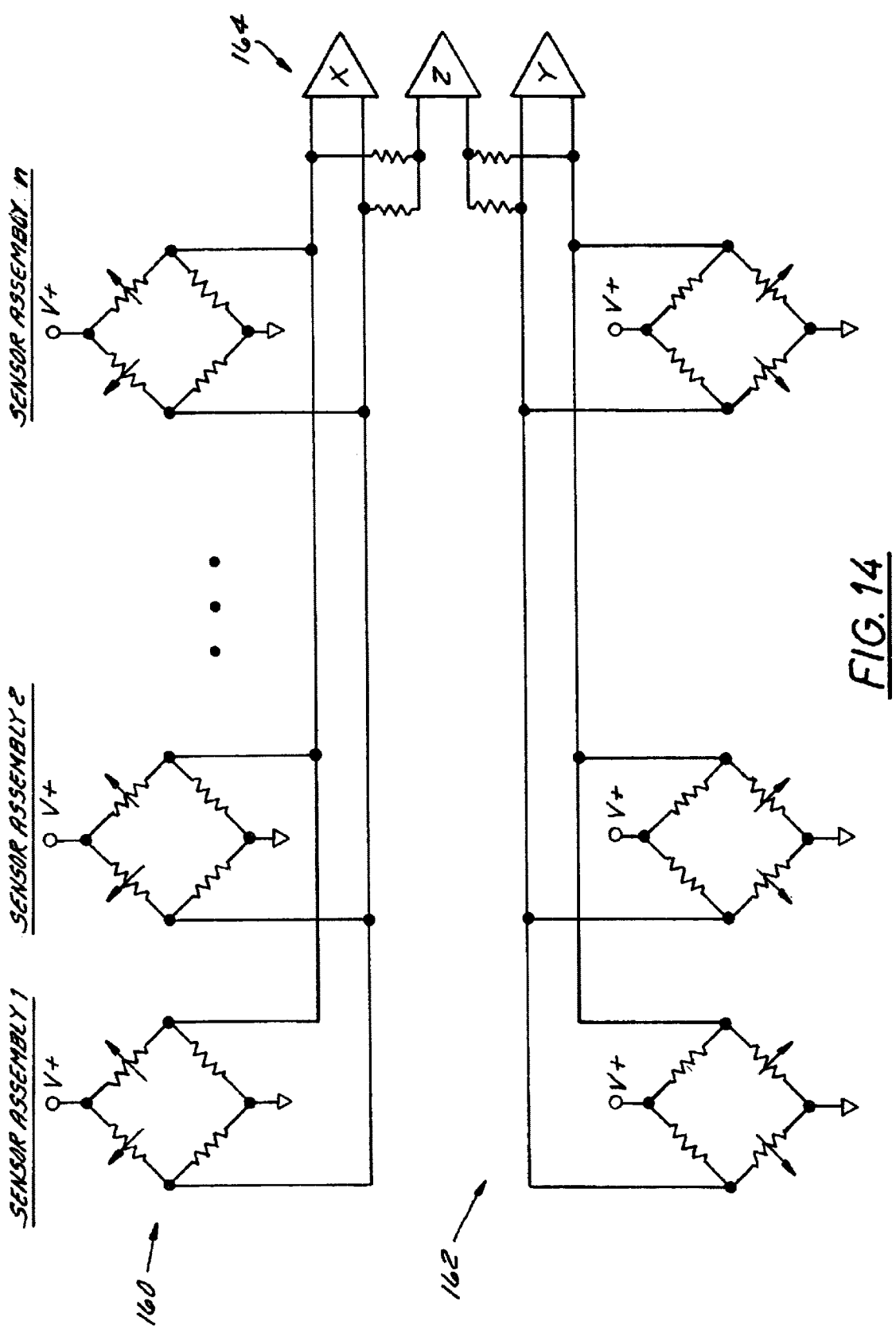
FIG. 14 is a schematic circuit diagram illustrating an alternate sensor bus to the bus shown in FIG. 12, wherein the strain sensors of the sensor assemblies are connected in parallel.

FIG. 14 illustrates an alternative to bus 122 shown in FIG. 12 wherein a circuit 160 has a passive sensor bus 162. A Wheatstone bridge circuit associated with each sensor assembly (for example, 40 in FIG. 5), 1 to n, is connected to a differential pair of sensors associated with the x-axis strain measurement (for example, sensors 22, 24 in FIG. 5), and with the y-axis strain measurement (for example, sensors 30, 32 in FIG. 5), respectively. The bridge circuit of each device can be considered to be in parallel with the other bridge circuits on sensor bus 162 each sending output signals to a common set of buffer amplifiers 164 associated with, for example, three axes of strain measurements. The output of amplifiers 164 is then communicated to, for example, data transmitter 131 of FIG. 12. Circuit 120 typically has better noise immunity than circuit 160 due to the proximity of buffer amplifiers 126 to the strain sensing elements. However, circuit 162 includes fewer active components and consumes less power due to the elimination of the plurality of buffer amplifiers at the location of each sensor assembly. Sensor bus 162, also in contrast to bus 122 requires four (4) signal wires in addition to the power and ground wires, for a total of six (6) wires to be routed to each sensor assembly location.

Figure 15:
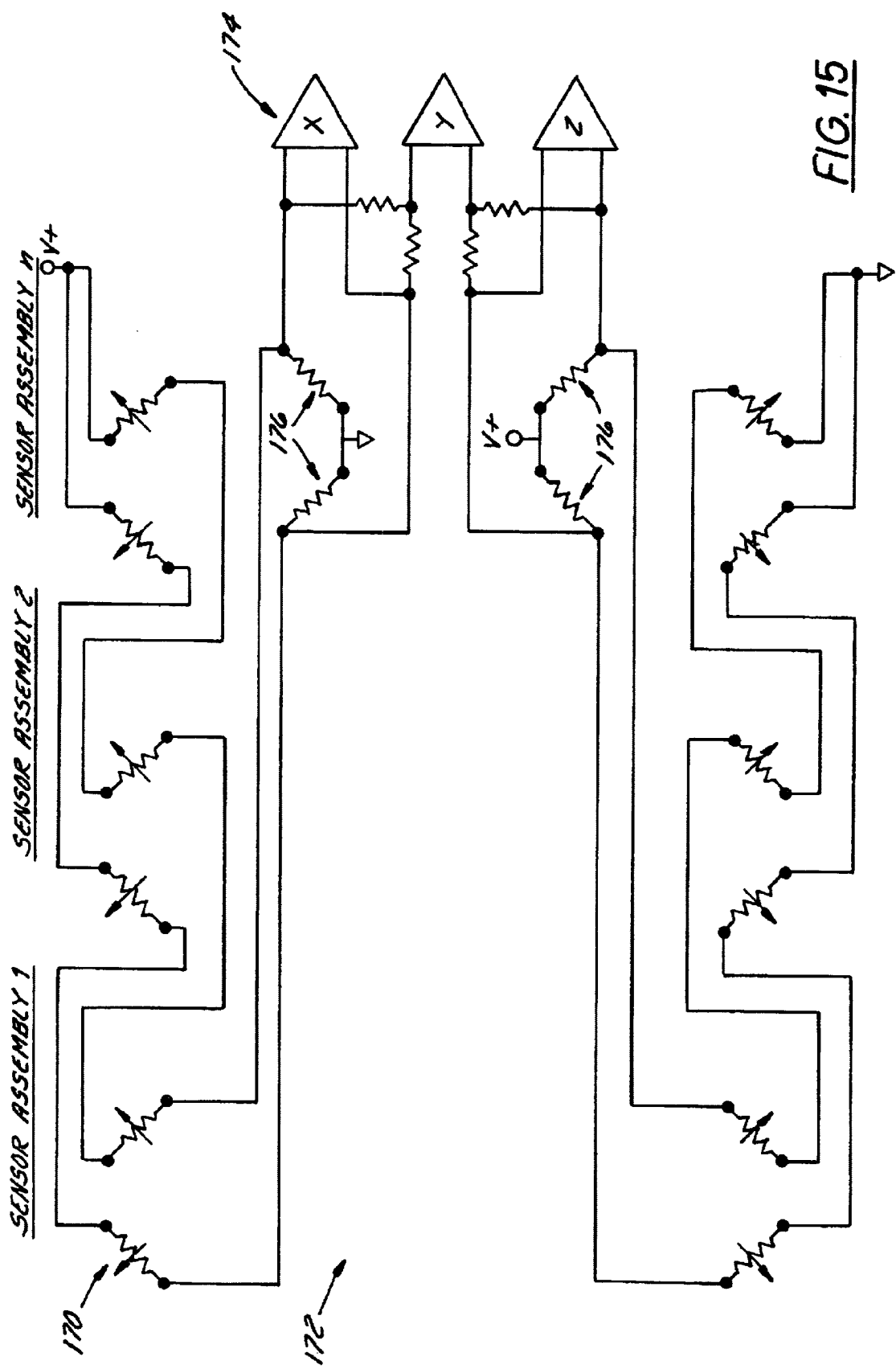
FIG. 15 is a schematic circuit diagram illustrating another alternative sensor bus to the bus shown in FIG. 12, wherein the strain sensors of the sensor assemblies are connected in series.

Contrary to the parallel arrangement of circuit 160 in FIG. 14, FIG. 15 illustrates a circuit 170 having a sensor bus 172 which connects the strain sensors of the multiple sensor assemblies in series. The advantage associated with circuit 170 is a high net resistance between power and ground. As a result, circuit 170 has a low power consumption. In FIG. 15, the reference resistors 178 (see FIGS. 6A and 6B and the associated description) are combined for all sensor assemblies on sensor bus 172 into four resistors at buffer amplifiers 174, such that the value is the sum of the reference resistors combined. Notably, resistors 176 may be distributed among the different locations of the sensor assemblies.

Figure 16:
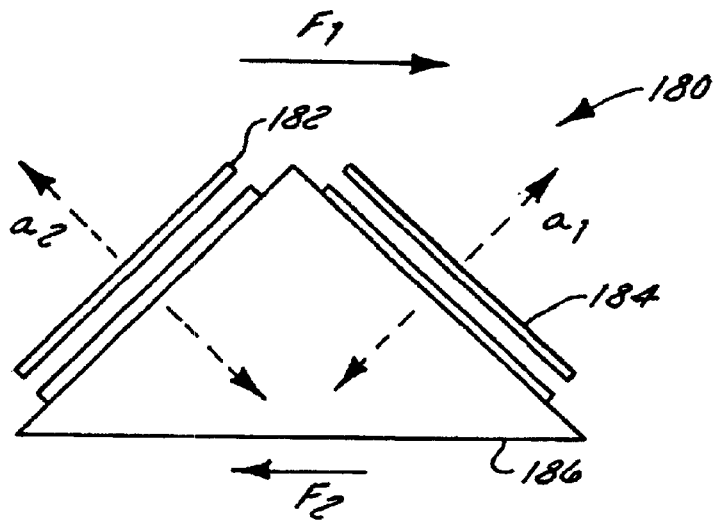
FIG. 16 is a schematic illustration of a parallel plate capacitor sensor used as the strain sensors of the sensor assemblies of FIGS. 4 and 5.

Referring next to FIG. 16, a sensor assembly 180 having a pair of parallel plate capacitive sensors 182, 184 disposed on opposed faces of a pyramid-shaped body 186 is shown. Sensors 182, 184 measure strain forces along the axes of elongation and contraction $a_1$, $a_2$ as before, wherein axes $a_1$ and $a_2$ are illustrated in reverse to indicate their effect normal to the plane of the plates of capacitive sensors 182, 184. Preferably, the pyramid-shaped body 186 is made of the same flexible material in which sensor assembly 180 is embedded, or at least in a material of comparable flexibility. Also, the dielectric (not shown) between the capacitor plates of sensors 182, 184 is a flexible material similar to the material of pyramid-shaped body 186 as well as the surrounding elastomeric material. For an applied shear strain, illustrated by forces $F_1$ and $F_2$, the $a_1$ axis will elongate while the $a_2$ axis will contract. The effect of this corresponding distortion will be an increase in plate separation of capacitive sensor 184, and a corresponding decrease in plate separation of capacitance sensor 182. Similar to the previous embodiments, the differential change in capacitance between sensors 182 and 184 is detected by an appropriate circuit conventional in the art to generate a signal indicative of the strain force.

Figure 17A:
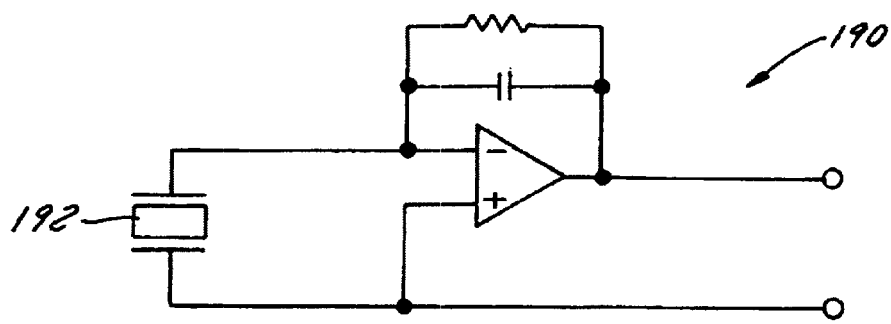
FIGS. 17A–17D are schematic circuit diagrams associated with using an alternative strain sensor.
Figure 17B:
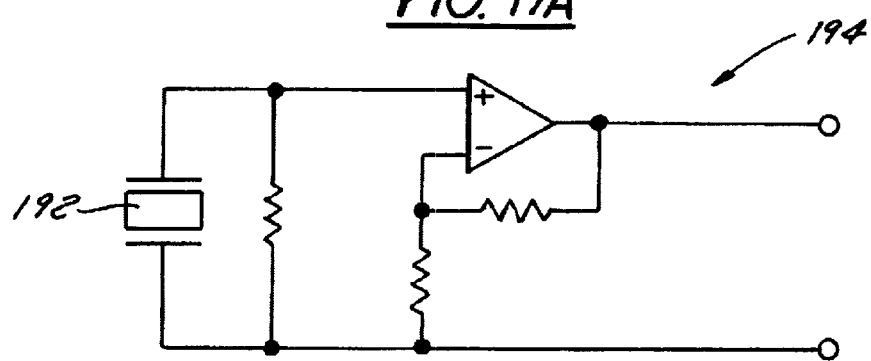
Figure 17C:
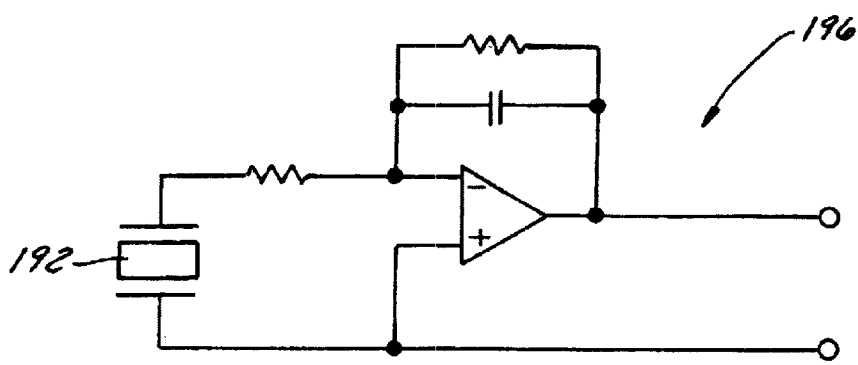
Figure 17D:
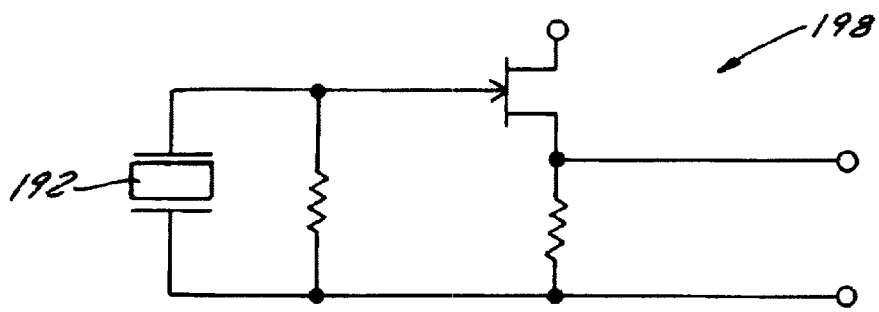

Referring next to FIGS. 17A–17D, circuits for determining strain forces detected by a piezoelectric strain sensor 192 are illustrated. In each case, it is preferable to locate a buffer amplifier circuit in close proximity to the sensor 192 so as to improve DC response of the circuit and to reduce the influence of static charge at the high-impedance input. In FIG. 17A, a buffer amplifier circuit 190 includes a charge amplifier where $V_{out}$ equals Q/C. In FIG. 17B, a circuit 194 coupled to a piezoelectric sensor 192 includes a non-inverting voltage gain amplifier conventional in the art. In FIG. 17C, a buffer circuit 196 coupled to sensor 192 includes an inverting voltage gain amplifier which may also act as a charge amplifier, as is conventional in the art. In FIG. 17D, buffer circuit 198 comprises a field effect transistor (FET) circuit interface for buffering the outputs of the sensor assemblies.

Figure 18:
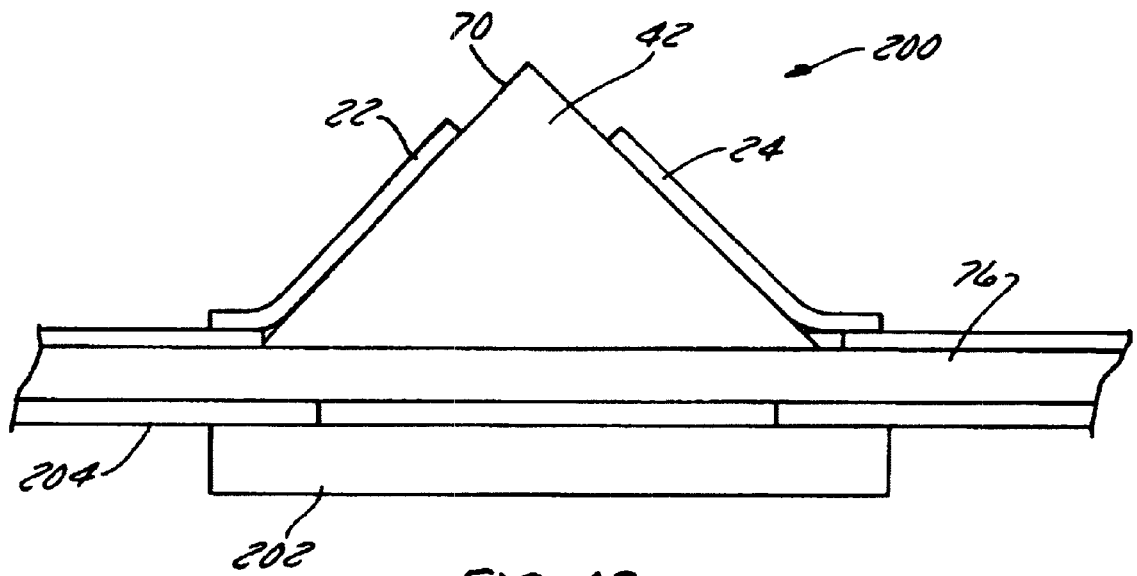
FIGS. 18 and 19 are partially broken away cross-sectional views similar to FIGS. 8 and 9, illustrating the components of alternative embodiments of the sensor assembly of the present invention.
Figure 19:
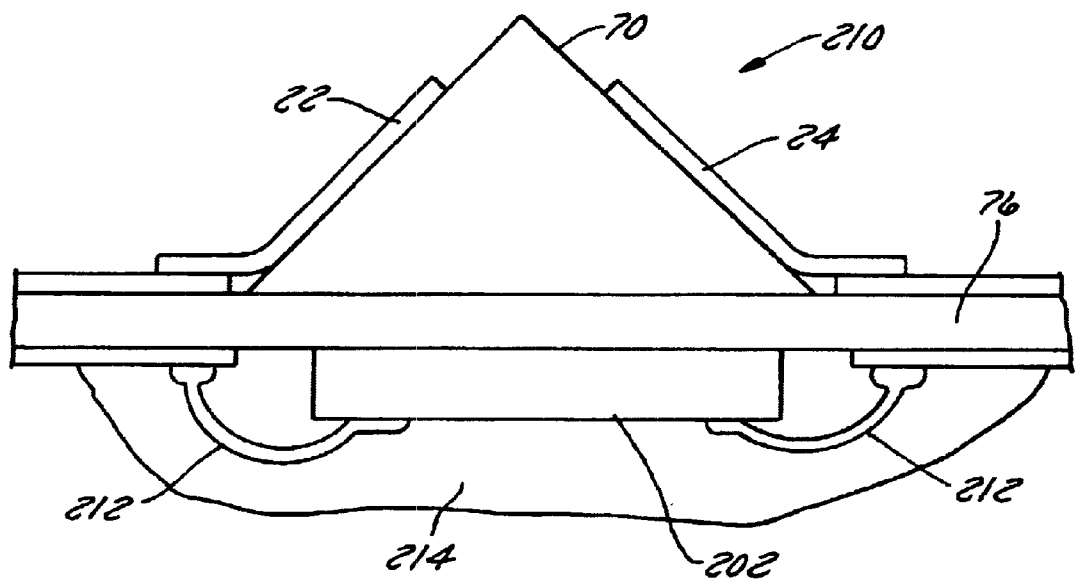

Turning to FIG. 18, in each of the above cases where a buffer amplifier is located in close proximity to the sensor assembly, the buffer amplifier is preferably mounted under the pyramid-shaped body of the sensor assembly on the opposite side of the flexible substrate. In FIG. 18, one embodiment of this configuration the amplifier is part of an IC 202 that is electrically bonded directly to conductors on a substrate via a connection 204. Inputs and outputs to the IC may be connected in this way to the multiple conductors patterned on the substrate. Alternatively, in FIG. 19, the configuration 210 utilizes wire bonds 212 to make the electrical connection from the substrate to the IC 202. In FIG. 19, it is necessary to "pot" the wire bonds in an epoxy 214 or other equivalent material, as described previously.

Figure 20:
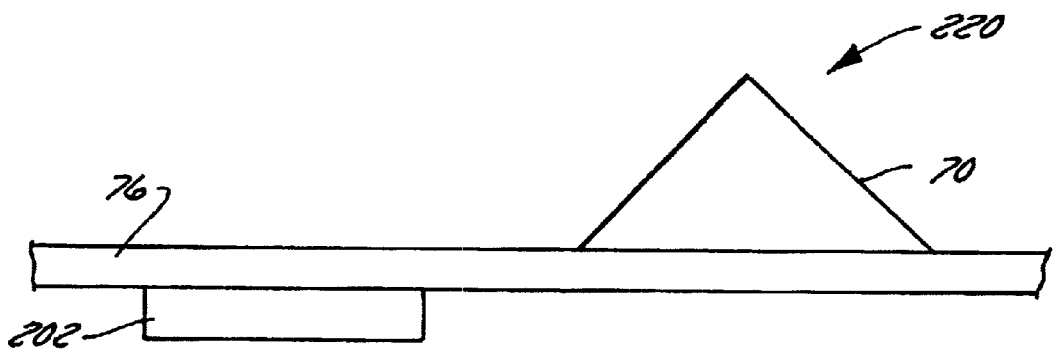
FIGS. 20 and 21 are partially broken away cross-sectional views of alternative embodiments of the sensor assemblies of FIGS. 18 and 19.
Figure 21:
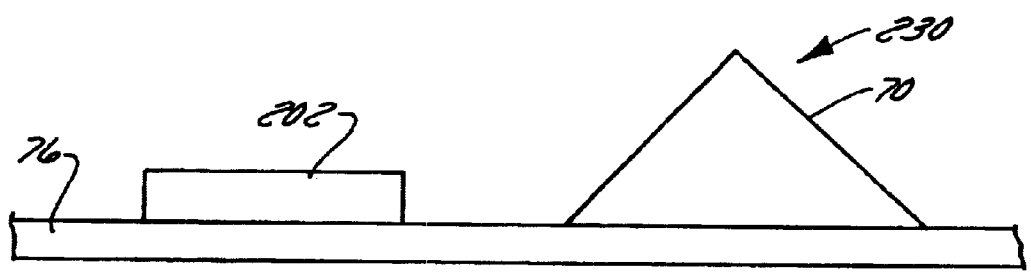

Referring to FIG. 20, in an alternative to the mounting of the silicon IC underneath the pyramid-shaped body of the sensor assembly shown in FIGS. 18 and 19, a silicon IC 222 is mounted adjacent to the body of sensor assembly 220. FIG. 20 shows IC 222 mounted on the opposite side of the substrate 76 relative to the mounting of the pyramid-shaped body 70, while FIG. 21 illustrates an IC 222 being mounted on the same side of substrate 76 as the pyramid-shaped body 70. In either case, the IC 202 in FIGS. 20 and 21 may be connected through direct electrical bonding as in FIG. 18, or by wire bonding as in FIG. 19.

Since these components are located within the tire, these circuits can be designed to sense and compensate for tire temperature effects according to well established methods. Temperature-compensated strain gauges and displacement sensors will not need tire temperature information to compensate for sensor signal changes caused by temperature variations, however, a temperature sensing device, such as a thermistor, or other temperature sensitive component, in a Wheatstone bridge circuit may be incorporated with the present invention. A temperature sensing device may be connected to the same transmitter as the strain sensing pyramid device in order to report the tire sensor to a receiver on board the vehicle. The radio-frequency transmitter may also report identification and/or other data, such as tire temperature or pressure Notably, the total shear strain within a tire will scale radially with the depth. Closer to the road, the strain is higher, and the strain decreases as measurements are made radially inwardly towards the steel belts. This strain gradient corresponds to increasing strain toward the point of the pyramid in the preferred embodiment. Tensile strain (i.e., strain along the vertical or z axis of the pyramid-shaped body as it passes through the tire contact patch) typically does not scale with depth at the same rate as the shear strain, and in fact may not scale with depth at all. Moreover, in general, the angle at which the strain sensors are oriented will effect their sensitivity to shear strain versus tensile strain.

Figure 22:
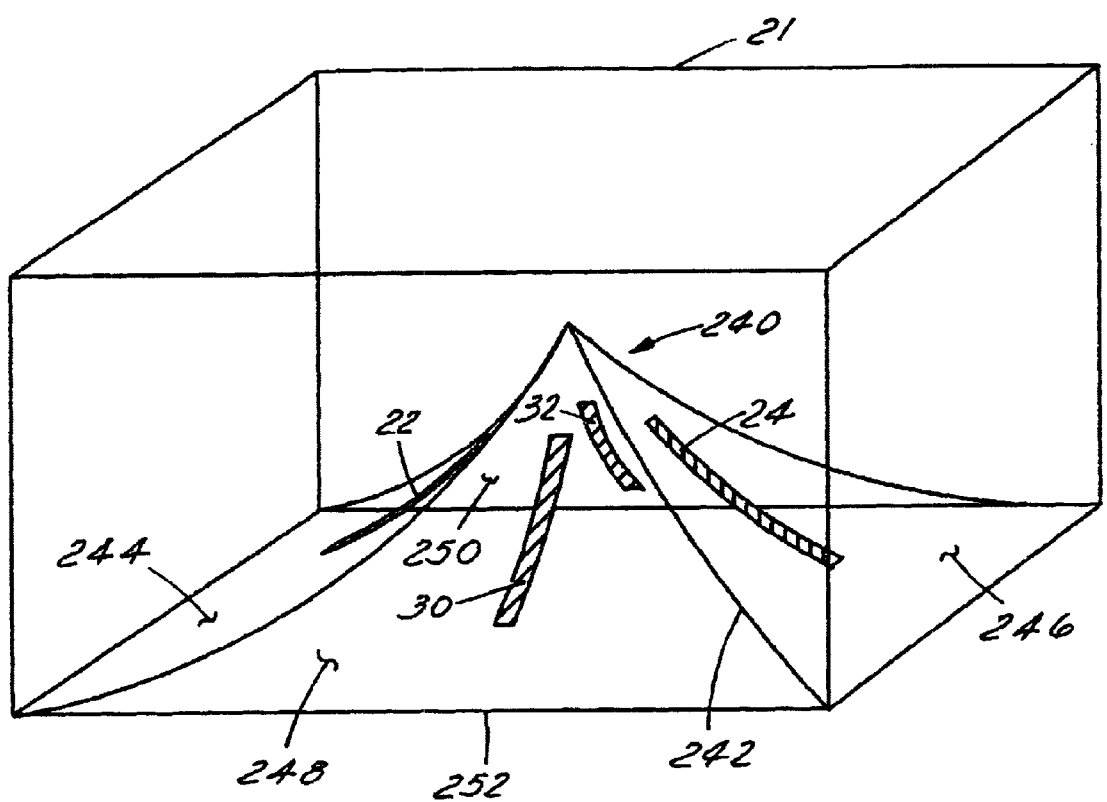
FIGS. 22 and 23 are perspective views of alternative sensor assemblies according to a preferred embodiment of the present invention, illustrating strain sensors mounted on a generally pyramid-shaped body embedded in the elastomeric material where the faces of the pyramids are concave and convex, respectively.
Figure 23:
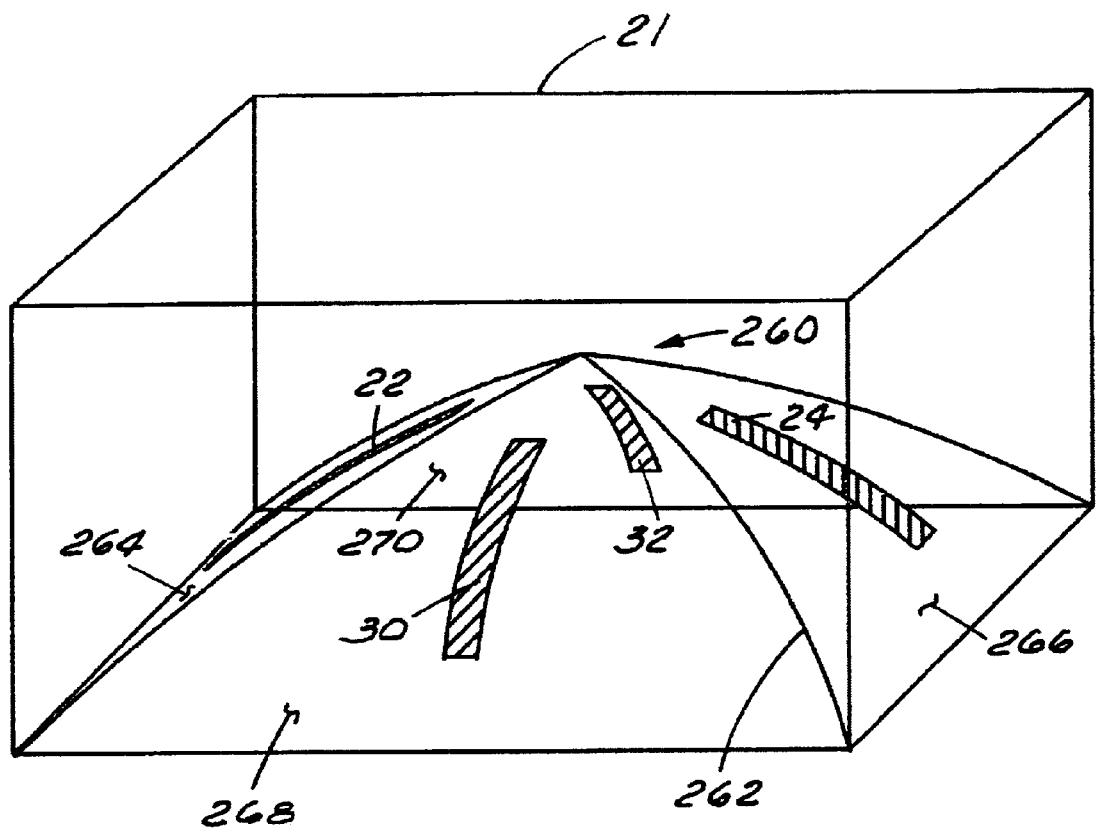

In this regard, turning next to FIGS. 22 and 23, alternative forms of the pyramid-shaped insert 40 in FIG. 5 are illustrated. In order to compensate for non-linearities in the strain versus traction response of the tire of the present invention, the sides of the pyramid on which the strain sensors are mounted may be curved. In particular, the sides may be concave or convex in shape as shown in FIGS. 22 and 23, respectively.

In both cases, the sides (concave or convex) of the sensor assembly are preferably symmetric about an axis "z" passing centrally through the apex of the pyramid so that the forces exerted on the elastomeric body 21 (for example, the rubber of a tire tread block) can be readily computed as described above. Generally, a sensor assembly 240 in FIG. 22 reduces the sensitivity to shear strain while increasing sensitivity to tensile strain. In FIG. 23, on the other hand, a sensor assembly 260 increases the sensitivity to shear strain while reducing sensitivity to tensile strain.

The above effects can also be accomplished by changing the angle of the pyramid faces, as described previously. However, the depth of the pyramid-shaped insert, and thus the sensors, will also change with the angle. As noted above, total shear strain scales radially with depth so if the angle is modified to modify the sensitivity of the sensor assembly to shear/tensile strains, the designer must also account for the effects associated with the depth of the sensor assembly. To the contrary, the concave and convex sides of the pyramid-shaped inserts 242, 262 shown in FIGS. 22 and 23 can be used to optimize the two factors (depth and sensitivity to x-y shear strain/z tensile strain) simultaneously, as depth of the sensors does not substantially change. In FIG. 22, a sensor assembly 240 is embedded in an elastomeric material such as body 21 and employs a flexible generally pyramid-shaped body or insert 242 having four faces, including first opposed faces 244, 246 and second opposed faces 248, 250. Similar to previous embodiments, assembly 240 is adapted to measure strain forces exerted on elastomeric body 21.

Insert 242 may be made of the same material as the surrounding elastomer of body 21, or may be made of some other appropriate material. Also, insert 242 may be truncated such that it has a flat top which may be desirable for manufacturing and ease of embedding the insert in, for example, a tire. In addition, the orientation of insert 242 with respect to the applied strain forces may be inverted, thereby inverting the response of the strain sensors 22, 24, 30, 32 to the applied strains on body 21.

Unlike previous embodiments, faces 244, 246, 248, 250 of generally pyramid-shaped body 242 are curved and thus have a changing slope. As noted above, insert 242 shown in FIG. 22 includes faces 244, 246, 248 and 250 that are concave. Noting that the connection of strain sensors 22, 24, 30, 32 to the flex circuit mentioned previously (72 in FIG. 8) is made at or near the edges (for example, lower edge 252 in FIG. 22) of the elastomeric body 21, the slope of the faces (for example, 248 in FIG. 22) at the interface of the two is smaller than, for instance, in the embodiment shown in FIG. 5. Therefore, the incident angle at which the corresponding sensors (for example, 30 in FIG. 22) are coupled to the flex circuit is smaller as well. This more linear interface provides a device that is more robust, and moreover, more readily manufactured and installed in a tire.

Similar to the previous embodiments, strain sensors 22, 24, 30, 32 of the sensor assembly 240 may be any sensor that changes one or more measurable properties as a result of strain along the plane in which corresponding sensors (for example, 22 and 24 on faces 244 and 246 of pyramid-shaped insert 240 in FIG. 22) lie. Further, because the faces are generally symmetrical about an axis extending through the apex of generally pyramid-shaped body 242, the force measured by, for example, sensors 22 and 24 is equal to the sheer strain measured by sensor 22 minus the sheer strain measured by sensor 24. This force is the amount of sheer strain along the X-axis, as that axis is shown in FIG. 4 and, the compressive force in the Z direction is equal to the sum of the tensile strains measured by sensors 22, 24, 30 and 32. In this way, as in the previous embodiments, a separate sensor arrangement for measuring compressive force is not required.

Similarly, in FIG. 23, a sensor assembly 260 is embedded in an elastomeric body 21 and employs a flexible generally pyramid-shaped body or insert 262 having four faces, including first opposed faces 264, 266 and second opposed faces 268, 270. Similar to previous embodiments, assembly 260 is adapted to measure strain forces exerted on the surrounding elastomeric material such as body 21.

Insert 262 may be made of the same material as the surrounding elastomer of body 21, or may be made of some other appropriate material. Also, insert 262 may be truncated such that it has a flat top which may be desirable for manufacturing and ease of embedding the insert in, for example, a tire. In addition, the orientation of insert 240 with respect to the applied strain forces may be inverted, thereby inverting the response of the strain sensors 22, 24, 30, 32 to the applied strains on body 21.

Unlike previous embodiments, faces of generally pyramid-shaped body 262 are curved and thus have a changing slope. In this case, faces 264, 266, 268, 270 shown in FIG. 23 are convex.

Similar to the previous embodiments, the strain sensors 22, 24, 30, 32 of the sensor assembly 260 may be any sensor that changes one or more measurable properties as a result of strain along the plane in which corresponding sensors (for example, 22 and 24 on faces 264 and 266 of pyramid-shaped insert 266 in FIG. 23) lie. Further, because the faces are generally symmetric about an axis extending through the apex of generally pyramid shaped body 260, the force measured by, for example, sensors 22 and 24 is equal to the sheer strain measured by sensor 22 minus the sheer strain measured by sensor 24. This force is the amount of sheer strain along the X-axis, as that axis is shown in FIG. 4 and, the compressive force in the Z direction is equal to the sum of the tensile strains measured by sensors 22, 24, 30 and 32. In this way, as in the previous embodiments, a separate sensor arrangement for measuring compressive force is not required.

Useful applications of the preferred embodiments are not limited to pneumatic passenger car tires with tread lugs. Racecars often use tires known in the field as slicks, which have very little if any tread pattern. Such race tires may incorporate the preferred embodiments described herein to the benefit of the performance of the racecar. Also non-pneumatic tires, such as rubber filled tires may similarly benefit from this invention.

The scope of the invention is not to be limited by the descriptions provided above, but rather is to be limited solely by the scope of the claims which follow.

What is claimed is:

1. A plurality of sensor assemblies embedded in an elastomeric material of a tire, each said sensor assembly comprising:

a pair of first strain sensors disposed on first opposed faces of a flexible pyramid-shaped body, said first strain sensors detecting a force in a first direction, wherein said first strain sensors generate corresponding output signals in response to strain in the first sensors generated by the force in the first direction, and wherein the force in the first direction is generally equal to the difference between the output signals of said first strain sensors;

a pair of second strain sensors disposed on second opposed faces of said body, said second opposed faces adjacent to said first opposed faces, and said second strain sensors detecting a force in a second direction orthogonal to said first direction, wherein said second strain sensors generate corresponding output signals in response to strain in the second sensors generated by the force in the second direction, and wherein the force in the second direction is generally equal to the difference between the output signals of said second strain sensors;

wherein a sum of the first output signals and the second output signals is indicative of a force in a third direction, and wherein the plurality of sensor assemblies are embedded in a tire in mutually spaced relationship.

2. The sensor assembly of claim 1, further including a bus to communicate signals generated by the plurality of sensor assemblies.

3. The sensor assembly of claim 2, wherein said bus is a five-wire bus.

4. The sensor assembly of claim 1, wherein a contact region is defined at a position where the tire contacts a surface, and wherein the plurality of sensor assemblies are mutually spaced about a circumference of the tire so that each sensor assembly of the plurality of sensor assemblies passes the contact region at a different time.

5. A process of producing a sensor assembly embedded in an elastomeric material of a tire, the process comprising:

providing a pyramid-shaped body and first and second pairs of strain sensors;

disposing the first pair on first opposed faces of the pyramid-shaped body;

disposing the second pair on second opposed faces of the pyramid-shaped body; and, placing the sensor assembly having the pyramid-shaped body with sensors on the first and second opposed faces in an uncured elastomeric material of a tire.

6. The process of claim 5, further comprising the step of embedding a plurality of said sensor assemblies around a circumference of the tire.

7. The process of claim 6, wherein the sensor assemblies are positioned in mutually spaced relationship.

8. The process of claim 7, wherein the sensor assemblies are positioned such that only one of the sensor assemblies passes through the contact patch of the tire during operation at a particular time.

9. The process of claim 6, further comprising the step of providing a sensing system including a sensor bus.

10. The process of claim 9, wherein the sensor bus includes a plurality of conductors, each of the conductors corresponding to one strain axis to be monitored.

11. The process of claim 9, wherein three orthogonal strain axes are monitored.

12. The process of claim 9, wherein the outputs of the sensor bus are electrically coupled to a transmitter.

13. The process of claim 9, wherein the bus is a passive sensor bus.

14. The process of claim 9, wherein the sensing system connects the strain gauges of the sensor assemblies in parallel.

15. A tire sensor assembly embedded in an elastomeric tire at a particular radial depth inward from a road contacting surface of the tire, said sensor assembly comprising:

a flexible generally pyramid-shaped body;

a pair of first strain sensors disposed on first opposed faces of said pyramid-shaped body, said first strain sensors detecting a force in a first direction; and wherein each face of said first opposed faces is non-planar.

16. The sensor assembly of claim 15, wherein said first opposed faces are curved.

17. The sensor assembly of claim 15, further comprising:

a pair of second strain sensors disposed on second opposed faces of said pyramid-shaped body, said second strain sensors detecting a force in a second direction, wherein each face of said second opposed faces is non-planar.

18. The sensor assembly of claim 17, wherein said first strain sensors generate corresponding output signals in response to strain in said first strain sensors generated by the force in the first direction, and wherein the force in the first direction is generally equal to the difference between the output signals of said first strain sensors, and wherein said second strain sensors generate corresponding output signals in response to strain in said second strain sensors generated by the force in the second direction, and wherein the force in the second direction is generally equal to the difference between the output signals of said second strain sensors.

19. The sensor assembly of claim 17, wherein said first and second opposed faces are generally symmetrical about an axis extending longitudinally through the apex of said pyramid-shaped body.

20. The sensor assembly of claim 17, wherein said first and second opposed faces are curved and which curvature determines the sensitivity of the sensor assembly generally independent of the radial depth.

21. The sensor assembly of claim 17, wherein the sensor assembly is more sensitive to a tensile strain than to a shear strain.

22. The sensor assembly of claim 21, wherein said first and second opposed faces are concave.

23. The sensor assembly of claim 17, wherein said first and second opposed faces are convex.

24. The sensor assembly of claim 17, wherein the forces in the first and second directions are indicative of tire traction.

25. The sensor assembly of claim 15, wherein said first pair of strain sensors are resistive strain sensors.

26. The sensor assembly of claim 15, wherein said first pair of strain sensors generate said first and second output signals differentially.

27. The sensor assembly of claim 15, wherein said first pair of strain sensors are arranged in a Wheatstone bridge circuit to detect said forces in said first direction.

28. The sensor assembly of claim 15, further including a second material that encapsulates said first pair of strain sensors, said second material being different than the material of the elastomeric tire.

29. The sensor assembly of claim 28, wherein a ratio of elastic moduluses between the material of the elastomeric tire and the second material correspondingly scales the strain forces sensed by the strain sensors.

30. The sensor assembly of claim 28, wherein the second material is one of polyimide and epoxy.

31. The sensor assembly of claim 15, further including an adhesive to couple the first pair of strain sensors to the pyramid-shaped body.

32. The sensor assembly of claim 31, further including a potting material disposed on the sensor assembly.

33. The sensor assembly of claim 32, wherein said potting material and said adhesive are the same.

34. The sensor assembly of claim 32, further including a topping layer disposed on said potting material so as to scale strain forces sensed by the first pair of strain sensors.

35. A method of embedding a sensor in a tire, the method comprising:
  providing a sensor assembly including a first pair of strain sensors disposed on first opposed faces of a generally pyramid-shaped body; and
  shaping the first opposed faces of the pyramid-shaped body so that each face of the first opposed faces is non-planar.

36. The method of claim 35, wherein the sensor assembly is a three-axis sensor assembly including a second pair of strain sensors disposed on second opposed faces of the pyramid-shaped body, and further including the step of shaping the second opposed faces so that each face of the second opposed faces is non-planar.

37. The method of claim 36, wherein the first and second opposed faces of the pyramid-shaped body are curved.

38. The method of claim 35, wherein said shaping step includes shaping the first opposed faces of the pyramid-shaped body so the faces are concave.

39. The method of claim 35, wherein said shaping step includes shaping the first opposed faces of the pyramid-shaped body so the faces are convex.

40. The method of claim 35, wherein said shaping step is based on a desired sensitivity of the sensor.

41. The method of claim 40, wherein the desired sensitivity is greater sensitivity to a tensile strain and less sensitivity to a shear strain.

42. A sensor assembly embedded in an elastomeric material of a vehicle tire at a depth radially inward from a contact surface of the tire, the sensor assembly comprising:
  a flexible pyramid-shaped body;
  a strain sensing element disposed on said body; and
  wherein said body includes curved faces that are shaped so as to determine the sensitivity of the sensor assembly generally independent of the radial depth.

43. The sensor assembly of claim 42, wherein said flexible body is generally pyramid-shaped.

* * * * *